(12) United States Patent
Walker et al.

(10) Patent No.: US 7,587,333 B1
(45) Date of Patent: Sep. 8, 2009

(54) METHOD AND APPARATUS FOR VENDING PRODUCTS

(75) Inventors: Jay S. Walker, Ridgefield, CT (US); Daniel E. Tedesco, New Canaan, CT (US); John M. Packes, Jr., Hawthorne, NY (US); Charles A. Rattner, Stamford, CT (US); Magdalena Mik, Greenwich, CT (US); Andrew S. Van Luchene, Norwalk, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 09/218,085

(22) Filed: Dec. 22, 1998

Related U.S. Application Data

(63) Continuation-in-part of application No. 09/012,163, filed on Jan. 22, 1998, now Pat. No. 6,397,193, and a continuation-in-part of application No. 08/920,116, filed on Aug. 26, 1997, now Pat. No. 6,119,099, and a continuation-in-part of application No. 08/947,798, filed on Oct. 9, 1997.

(51) Int. Cl.
*G06Q 40/00* (2006.01)
(52) U.S. Cl. .......................... 705/15; 705/16
(58) Field of Classification Search ............. 705/10–16; 700/231–232, 238–244
See application file for complete search history.

(56) References Cited

U.S. PATENT DOCUMENTS

| | | | |
|---|---|---|---|
| 2,607,463 A | 8/1952 | Saigh, Jr. | |
| 3,442,442 A | 5/1969 | Neidig | |
| 3,573,747 A | 4/1971 | Adams et al. | 340/172.5 |
| 3,691,527 A | 9/1972 | Yamamoto | |
| 3,705,384 A | 12/1972 | Wahlberg | 340/149 |
| 3,747,733 A | 7/1973 | Knickerbocker | 194/10 |
| 3,937,929 A | 2/1976 | Knauer | |
| 4,008,792 A | 2/1977 | Levasseur | |

(Continued)

FOREIGN PATENT DOCUMENTS

CA 2070736 A1 6/1992

(Continued)

OTHER PUBLICATIONS

Fink, R. Data Processing: Pepsico, Financial World, vol. 161, #19, p. 52, Sep. 29, 1992.*

(Continued)

*Primary Examiner*—Thu Thao Havan
(74) *Attorney, Agent, or Firm*—Walker Digital Management, LLC

(57) ABSTRACT

A method and apparatus is disclosed for advancing the sale of vending machine products. The invention enables selling products without revealing the identity of the product. By concealing the identity of the products from a consumer prior to receiving payment, the present invention promotes the automated sale of perishable, slow-selling and/or less profitable products, to increase the overall profitability of a vending machine. Various embodiments are disclosed, including: predetermined price embodiments in which a vending machine sells one or more mystery products for a predetermined price; consumer-specified price embodiments in which a consumer is allowed to specify a price for one or more mystery products; and upsell embodiments in which a vending machine offers one or more upsell mystery products in exchange for the amount of change owed to a consumer, or in exchange for an amount of change owed to a consumer plus an additional monetary value.

18 Claims, 8 Drawing Sheets

U.S. PATENT DOCUMENTS

| | | | |
|---|---|---|---|
| RE29,450 E | 10/1977 | Goldsby et al. | 340/150 |
| 4,108,361 A | 8/1978 | Krause | 235/375 |
| 4,237,537 A | 12/1980 | Pitches et al. | 364/465 |
| 4,245,730 A | 1/1981 | Bachmann et al. | 194/1 A |
| 4,258,837 A | 3/1981 | Manos et al. | 194/1 N |
| 4,282,575 A | 8/1981 | Hoskinson | |
| 4,316,532 A | 2/1982 | Levasseur | |
| 4,323,770 A | 4/1982 | Dieulot et al. | 235/375 |
| 4,341,951 A | 7/1982 | Benton | |
| 4,359,147 A | 11/1982 | Levasseur | 194/1 N |
| 4,376,479 A | 3/1983 | Sugimoto et al. | 194/1 N |
| 4,412,292 A | 10/1983 | Sedam et al. | |
| 4,420,751 A | 12/1983 | Paganini et al. | 340/825.33 |
| 4,478,353 A | 10/1984 | Levasseur | 221/14 |
| 4,494,197 A | 1/1985 | Troy et al. | 364/412 |
| 4,498,570 A | 2/1985 | King et al. | |
| 4,500,880 A | 2/1985 | Gomersall et al. | 340/825.35 |
| 4,518,098 A | 5/1985 | Fleischer | 221/15 |
| 4,551,935 A | 11/1985 | Bachmann et al. | |
| 4,554,446 A | 11/1985 | Murphy et al. | |
| 4,567,609 A | 1/1986 | Metcalf | |
| 4,574,947 A | 3/1986 | Hutchings | 206/45.34 |
| RE32,115 E | 4/1986 | Lockwood et al. | |
| 4,593,361 A | 6/1986 | Otten | 364/479 |
| 4,598,378 A | 7/1986 | Giacomo | 364/479 |
| 4,603,390 A | 7/1986 | Mehdipour et al. | |
| 4,639,875 A | 1/1987 | Abraham et al. | 364/479 |
| 4,654,800 A * | 3/1987 | Hayashi et al. | 700/236 |
| 4,669,730 A | 6/1987 | Small | 273/138 A |
| 4,677,553 A | 6/1987 | Roberts et al. | 364/412 |
| 4,679,150 A | 7/1987 | Hayashi et al. | |
| 4,689,742 A | 8/1987 | Troy et al. | 364/412 |
| 4,723,212 A | 2/1988 | Mindrum et al. | |
| 4,734,858 A | 3/1988 | Schlafly | |
| 4,736,096 A | 4/1988 | Ushikubo | 235/472 |
| 4,737,910 A | 4/1988 | Kimbrow | |
| 4,743,022 A | 5/1988 | Wood | |
| 4,760,247 A | 7/1988 | Keane et al. | 235/454 |
| 4,766,548 A | 8/1988 | Cedrone et al. | 364/479 |
| 4,799,156 A | 1/1989 | Shavit et al. | |
| 4,815,741 A | 3/1989 | Small | 273/138 A |
| 4,817,166 A | 3/1989 | Gonzalez et al. | |
| 4,817,990 A | 4/1989 | Krost | |
| 4,825,045 A | 4/1989 | Humble | 235/383 |
| 4,833,607 A | 5/1989 | Dethloff et al. | |
| 4,834,231 A | 5/1989 | Awane et al. | 194/217 |
| 4,839,507 A | 6/1989 | May | 235/381 |
| 4,854,590 A | 8/1989 | Jolliff et al. | |
| 4,857,840 A | 8/1989 | Lanchais | |
| 4,859,838 A | 8/1989 | Okiharu | 235/383 |
| 4,878,248 A | 10/1989 | Shyu et al. | |
| 4,882,473 A | 11/1989 | Bergeron et al. | 235/380 |
| 4,882,675 A | 11/1989 | Nichtberger et al. | |
| 4,899,906 A | 2/1990 | Bella | 221/67 |
| 4,906,828 A | 3/1990 | Halpers | |
| 4,908,761 A | 3/1990 | Tai | 364/401 |
| 4,910,672 A | 3/1990 | Off et al. | |
| 4,922,435 A | 5/1990 | Cahlander et al. | |
| 4,922,522 A | 5/1990 | Scanlon | 379/95 |
| 4,937,853 A | 6/1990 | Brule et al. | 379/96 |
| 4,947,028 A | 8/1990 | Gorog | |
| 4,963,723 A | 10/1990 | Masada | |
| 4,973,952 A | 11/1990 | Malec et al. | 340/825.35 |
| 4,982,337 A | 1/1991 | Burr et al. | 364/479 |
| 4,982,346 A | 1/1991 | Giruard et al. | |
| 4,992,940 A | 2/1991 | Dworkin | |
| 4,993,714 A | 2/1991 | Golightly | |
| 4,999,763 A | 3/1991 | Ousborne | 364/140 |
| 5,010,485 A | 4/1991 | Bigari | |
| 5,025,372 A | 6/1991 | Burton et al. | |
| 5,029,098 A * | 7/1991 | Levasseur | 705/10 |
| 5,034,739 A | 7/1991 | Gruhl | |
| 5,039,848 A | 8/1991 | Stoken | |
| 5,056,019 A | 10/1991 | Schultz et al. | |
| 5,058,044 A | 10/1991 | Stewart et al. | |
| 5,064,999 A | 11/1991 | Okamoto et al. | |
| 5,081,685 A | 1/1992 | Jones, III et al. | |
| 5,091,713 A | 2/1992 | Horne et al. | 340/541 |
| 5,117,354 A | 5/1992 | Long et al. | |
| 5,117,407 A | 5/1992 | Vogel | 369/30 |
| 5,119,295 A | 6/1992 | Kapur | 364/412 |
| 5,128,862 A | 7/1992 | Mueller | |
| 5,132,914 A | 7/1992 | Cahlander et al. | 364/478 |
| 5,136,658 A | 8/1992 | Mori | |
| 5,172,328 A | 12/1992 | Cahlander et al. | 364/478 |
| 5,173,851 A | 12/1992 | Off et al. | |
| 5,176,224 A | 1/1993 | Spector | |
| 5,177,342 A | 1/1993 | Adams | 235/379 |
| 5,185,695 A | 2/1993 | Pruchnicki | |
| 5,189,607 A | 2/1993 | Shirasaki et al. | |
| 5,191,410 A | 3/1993 | McCalley et al. | |
| 5,192,854 A | 3/1993 | Counts | 235/375 |
| 5,193,648 A | 3/1993 | Yuter | |
| 5,201,010 A | 4/1993 | Deaton et al. | 382/7 |
| 5,202,826 A | 4/1993 | McCarthy | |
| 5,204,675 A | 4/1993 | Sekine | |
| 5,216,595 A | 6/1993 | Protheroe | 364/412 |
| 5,223,698 A | 6/1993 | Kapur | |
| 5,231,569 A | 7/1993 | Myatt et al. | 364/408 |
| 5,239,165 A | 8/1993 | Novak | 235/375 |
| 5,243,515 A | 9/1993 | Lee | 364/401 |
| 5,245,533 A | 9/1993 | Marshall | 364/401 |
| 5,253,165 A | 10/1993 | Leiseca et al. | |
| 5,256,863 A | 10/1993 | Ferguson et al. | |
| 5,257,179 A | 10/1993 | DeMar | 364/410 |
| 5,262,941 A | 11/1993 | Saladin et al. | 364/408 |
| 5,267,452 A | 12/1993 | Zinsmeyer et al. | 62/505 |
| 5,269,521 A * | 12/1993 | Rossides | 705/14 |
| 5,274,547 A | 12/1993 | Zoffel et al. | 364/408 |
| 5,283,731 A | 2/1994 | Lalonde et al. | 364/401 |
| 5,287,268 A | 2/1994 | McCarthy | |
| 5,297,031 A | 3/1994 | Gutterman et al. | 364/408 |
| 5,302,811 A | 4/1994 | Fukatsu | |
| 5,305,195 A | 4/1994 | Murphy | |
| 5,309,355 A | 5/1994 | Lockwood | |
| 5,315,093 A | 5/1994 | Stewart | |
| 5,315,664 A | 5/1994 | Kumagai | |
| 5,319,542 A | 6/1994 | King, Jr. et al. | |
| 5,325,291 A | 6/1994 | Garrett et al. | |
| 5,339,250 A | 8/1994 | Durbin | 364/479 |
| 5,353,218 A | 10/1994 | De Lapa et al. | 364/401 |
| 5,353,219 A | 10/1994 | Mueller et al. | |
| 5,367,452 A | 11/1994 | Gallery et al. | 364/401 |
| 5,368,129 A | 11/1994 | Von Kohorn | 186/52 |
| 5,371,796 A | 12/1994 | Avarne | 380/23 |
| 5,380,991 A | 1/1995 | Valencia et al. | 235/383 |
| 5,381,155 A | 1/1995 | Gerber | |
| 5,383,111 A | 1/1995 | Homma et al. | |
| RE34,915 E | 4/1995 | Nichtberger et al. | 364/401 |
| 5,408,417 A | 4/1995 | Wilder | 364/479 |
| 5,420,606 A | 5/1995 | Begum et al. | |
| 5,422,473 A | 6/1995 | Kamata | |
| 5,425,108 A | 6/1995 | Hwang et al. | |
| 5,434,394 A | 7/1995 | Roach et al. | 235/375 |
| 5,445,295 A | 8/1995 | Brown | 221/3 |
| 5,450,938 A | 9/1995 | Rademacher | 194/206 |
| 5,452,344 A | 9/1995 | Larson | 379/107 |
| 5,459,306 A | 10/1995 | Stein et al. | 235/383 |
| 5,481,094 A | 1/1996 | Suda | 235/383 |
| 5,482,139 A | 1/1996 | Rivalto | |
| 5,495,412 A | 2/1996 | Thiessen | |
| 5,504,475 A | 4/1996 | Houdou et al. | 340/825.35 |
| 5,504,675 A | 4/1996 | Cragun et al. | 364/401 |
| 5,510,979 A | 4/1996 | Moderi et al. | 364/405 |

| | | | | | | |
|---|---|---|---|---|---|---|
| 5,511,646 A * | 4/1996 | Maldanis et al. ............. 194/217 | | 5,774,874 A | 6/1998 | Veeneman et al. |
| 5,513,117 A | 4/1996 | Small | | 5,780,133 A * | 7/1998 | Engstrom .................. 428/40.1 |
| 5,521,364 A | 5/1996 | Kimura et al. | | 5,791,991 A | 8/1998 | Small |
| 5,526,257 A | 6/1996 | Lerner | | 5,794,207 A | 8/1998 | Walker et al. |
| 5,536,045 A | 7/1996 | Adams | | 5,799,284 A | 8/1998 | Bourquin |
| 5,537,314 A | 7/1996 | Kanter | | 5,802,015 A | 9/1998 | Rothschild et al. ............ 368/10 |
| 5,544,040 A | 8/1996 | Gerbaulet | | 5,806,044 A | 9/1998 | Powell |
| 5,544,784 A | 8/1996 | Malspina | | 5,809,144 A | 9/1998 | Sirbu et al. |
| 5,546,316 A | 8/1996 | Buckley et al. ........ 364/479.03 | | 5,816,918 A | 10/1998 | Kelly et al. |
| 5,550,746 A * | 8/1996 | Jacobs ........................ 700/231 | | 5,822,216 A | 10/1998 | Satchell, Jr. et al. .... 364/479.01 |
| 5,557,721 A | 9/1996 | Fite et al. | | 5,822,736 A | 10/1998 | Hartman et al. ................. 705/1 |
| 5,568,406 A | 10/1996 | Gerber | | 5,831,862 A * | 11/1998 | Hetrick et al. .............. 700/232 |
| 5,572,653 A | 11/1996 | DeTemple et al. .......... 395/501 | | 5,832,457 A | 11/1998 | O'Brien et al. |
| 5,581,064 A | 12/1996 | Riley et al. ................. 235/383 | | 5,832,458 A | 11/1998 | Jones |
| 5,591,972 A | 1/1997 | Noble et al. | | 5,835,896 A | 11/1998 | Fisher et al. |
| 5,592,375 A | 1/1997 | Salmon et al. .............. 395/207 | | 5,842,178 A | 11/1998 | Giovannoli |
| 5,592,376 A | 1/1997 | Hodroff | | 5,842,212 A | 11/1998 | Ballurio et al. |
| 5,592,378 A | 1/1997 | Cameron et al. ............ 395/227 | | 5,844,808 A * | 12/1998 | Konsmo et al. ........ 364/479.14 |
| 5,596,501 A | 1/1997 | Comer et al. ......... 364/464.23 | | 5,845,259 A | 12/1998 | West et al. |
| 5,602,377 A | 2/1997 | Beller et al. ................. 235/462 | | 5,845,265 A | 12/1998 | Woolston |
| 5,604,901 A | 2/1997 | Kelley et al. | | 5,848,399 A | 12/1998 | Burke |
| 5,608,643 A * | 3/1997 | Wichter et al. ......... 364/479.14 | | 5,850,446 A | 12/1998 | Berger et al. |
| 5,611,051 A | 3/1997 | Pirelli | | 5,855,007 A | 12/1998 | Jovicic et al. |
| 5,611,052 A | 3/1997 | Dykstra et al. .............. 395/238 | | 5,857,175 A | 1/1999 | Day et al. |
| 5,612,527 A | 3/1997 | Ovadia | | 5,860,362 A | 1/1999 | Smith ........................ 101/494 |
| 5,612,868 A | 3/1997 | Off et al. | | 5,864,604 A | 1/1999 | Moen et al. |
| 5,613,620 A * | 3/1997 | Center et al. ................. 221/133 | | 5,864,822 A | 1/1999 | Baker, III |
| 5,615,269 A | 3/1997 | Micali ......................... 380/49 | | 5,870,716 A | 2/1999 | Sugiyama et al. |
| 5,620,079 A | 4/1997 | Molbak | | 5,870,717 A | 2/1999 | Wiecha |
| 5,621,201 A | 4/1997 | Langhans et al. ........... 235/380 | | 5,870,719 A | 2/1999 | Maritzen et al. |
| 5,621,640 A | 4/1997 | Burke | | 5,873,069 A * | 2/1999 | Reuhl et al. .................... 705/20 |
| 5,621,812 A | 4/1997 | Deaton et al. | | 5,875,110 A | 2/1999 | Jacobs .................. 364/479.02 |
| 5,630,357 A | 5/1997 | Akiyama ................... 99/323.6 | | 5,878,139 A | 3/1999 | Rosen |
| 5,631,724 A | 5/1997 | Sawada et al. | | 5,878,401 A | 3/1999 | Joseph ......................... 705/22 |
| 5,632,010 A | 5/1997 | Briechle et al. ................. 345/1 | | 5,883,810 A | 3/1999 | Franklin et al. |
| 5,637,859 A | 6/1997 | Menoud | | 5,887,271 A | 3/1999 | Powell |
| 5,638,302 A | 6/1997 | Gerber | | 5,890,136 A | 3/1999 | Kipp |
| 5,642,484 A | 6/1997 | Harrison, III et al. | | 5,905,246 A | 5/1999 | Fajkowski |
| 5,649,114 A | 7/1997 | Deaton et al. | | 5,907,830 A | 5/1999 | Engel et al. |
| 5,651,075 A | 7/1997 | Frazier et al. | | 5,918,213 A | 6/1999 | Bernard et al. |
| 5,655,007 A | 8/1997 | McAllister | | 5,924,078 A | 7/1999 | Naftzger |
| 5,666,493 A | 9/1997 | Wojcik et al. | | 5,924,080 A | 7/1999 | Johnson |
| 5,675,662 A | 10/1997 | Deaton et al. | | 5,924,082 A | 7/1999 | Silverman et al. |
| 5,685,435 A | 11/1997 | Picioccio et al. | | 5,930,145 A | 7/1999 | Yuyama et al. ........ 364/479.01 |
| 5,687,087 A | 11/1997 | Taggart ................. 364/479.03 | | 5,930,771 A | 7/1999 | Stapp .......................... 705/28 |
| 5,687,322 A | 11/1997 | Deaton et al. | | 5,937,391 A | 8/1999 | Ikeda et al. |
| 5,692,132 A | 11/1997 | Hogan | | 5,938,717 A | 8/1999 | Dunne et al. |
| 5,701,252 A | 12/1997 | Facchin et al. .............. 364/479 | | 5,947,328 A * | 9/1999 | Kovens et al. ............... 221/129 |
| 5,708,782 A | 1/1998 | Larson et al. | | 5,948,038 A | 9/1999 | Daly et al. |
| 5,710,557 A | 1/1998 | Schuette | | 5,949,688 A | 9/1999 | Montoya et al. ............. 700/235 |
| 5,710,886 A | 1/1998 | Christiansen et al. | | 5,956,695 A | 9/1999 | Carrithers et al. |
| 5,710,887 A | 1/1998 | Chelliah et al. | | 5,959,869 A | 9/1999 | Miller et al. ............ 364/479.01 |
| 5,713,795 A | 2/1998 | Kohorn | | 5,963,452 A | 10/1999 | Etoh et al. ............. 364/479.06 |
| 5,717,866 A | 2/1998 | Naftzger | | 5,963,939 A | 10/1999 | McCann et al. |
| 5,719,396 A | 2/1998 | Jack et al. | | 5,964,660 A | 10/1999 | James et al. |
| 5,726,450 A | 3/1998 | Peterson et al. | | 5,970,469 A | 10/1999 | Scroggie et al. |
| 5,727,163 A | 3/1998 | Bezos | | 5,974,399 A | 10/1999 | Giuliani et al. |
| 5,727,164 A | 3/1998 | Kaye et al. | | 5,988,346 A | 11/1999 | Tedesco et al. ............... 194/217 |
| 5,732,398 A | 3/1998 | Tagawa ......................... 705/5 | | 5,991,740 A | 11/1999 | Messer |
| 5,732,950 A | 3/1998 | Moody ....................... 273/292 | | 5,995,942 A | 11/1999 | Smith et al. |
| 5,734,150 A | 3/1998 | Brown et al. ............... 235/381 | | 5,997,236 A * | 12/1999 | Picioccio et al. ............ 414/403 |
| 5,734,838 A | 3/1998 | Robinson et al. | | 5,997,928 A | 12/1999 | Kaish et al. .................. 426/418 |
| 5,737,710 A | 4/1998 | Anthonyson | | 5,999,914 A | 12/1999 | Blinn et al. |
| 5,739,512 A | 4/1998 | Tognazzini | | 6,012,834 A | 1/2000 | Dueck et al. .................. 364/479 |
| 5,748,485 A | 5/1998 | Christiansen et al. ....... 700/234 | | 6,014,634 A | 1/2000 | Scroggie et al. |
| 5,754,653 A | 5/1998 | Canfield | | 6,016,504 A | 1/2000 | Arnold et al. |
| 5,758,328 A | 5/1998 | Giovannoli | | 6,017,157 A | 1/2000 | Garfinkle |
| 5,761,648 A | 6/1998 | Golden et al. | | 6,021,394 A | 2/2000 | Takahashi ..................... 705/10 |
| 5,768,142 A | 6/1998 | Jacobs | | 6,026,370 A | 2/2000 | Jermyn |
| 5,769,269 A | 6/1998 | Peters .......................... 221/7 | | 6,026,375 A | 2/2000 | Hall et al. |
| 5,772,510 A * | 6/1998 | Roberts ........................ 463/17 | | 6,029,139 A | 2/2000 | Cunningham et al. |
| 5,774,868 A | 6/1998 | Cragun et al. ................ 705/10 | | 6,029,141 A | 2/2000 | Bezos et al. |
| 5,774,870 A | 6/1998 | Storey | | 6,035,284 A | 3/2000 | Straub et al. |

| | | | |
|---|---|---|---|
| 6,038,551 A | 3/2000 | Barlow et al. | |
| 6,048,267 A | 4/2000 | Wichinsky | 463/13 |
| 6,049,777 A | 4/2000 | Sheena et al. | 705/10 |
| 6,050,568 A | 4/2000 | Hachquet | 273/292 |
| 6,052,667 A | 4/2000 | Walker et al. | 705/15 |
| 6,055,513 A | 4/2000 | Katz | |
| 6,058,373 A | 5/2000 | Blinn et al. | |
| 6,058,375 A | 5/2000 | Park | |
| 6,061,660 A | 5/2000 | Eggleston et al. | |
| 6,073,840 A | 6/2000 | Marion | |
| 6,076,070 A | 6/2000 | Stack | |
| 6,078,866 A | 6/2000 | Buck et al. | |
| 6,085,168 A | 7/2000 | Mori et al. | |
| 6,101,485 A | 8/2000 | Fortenberry et al. | |
| 6,115,649 A | 9/2000 | Sakata | |
| 6,119,099 A | 9/2000 | Walker et al. | |
| 6,131,085 A | 10/2000 | Rossides | |
| 6,134,534 A | 10/2000 | Walker et al. | |
| 6,138,106 A * | 10/2000 | Walker et al. | 705/14 |
| 6,167,382 A | 12/2000 | Sparks et al. | |
| 6,192,349 B1 | 2/2001 | Husemann et al. | |
| 6,193,154 B1 | 2/2001 | Phillips et al. | |
| 6,193,155 B1 | 2/2001 | Walker et al. | |
| 6,205,435 B1 | 3/2001 | Biffar | |
| 6,223,163 B1 | 4/2001 | Van Luchene | 705/1 |
| 6,236,971 B1 | 5/2001 | Stefik et al. | |
| 6,243,691 B1 | 6/2001 | Fisher et al. | |
| 6,247,047 B1 | 6/2001 | Wolff | |
| 6,249,772 B1 | 6/2001 | Walker et al. | |
| 6,260,024 B1 | 7/2001 | Shkedy | |
| 6,266,651 B1 | 7/2001 | Woolston | |
| 6,321,984 B1 | 11/2001 | McCall et al. | |
| 6,324,520 B1 | 11/2001 | Walker et al. | 705/16 |
| 6,330,544 B1 | 12/2001 | Walker et al. | |
| 6,370,513 B1 | 4/2002 | Kolawa et al. | |
| 6,405,174 B1 | 6/2002 | Walker et al. | |
| 6,467,686 B1 | 10/2002 | Guthrie et al. | |
| 6,512,570 B2 | 1/2003 | Garfinkle et al. | |
| 6,584,448 B1 | 6/2003 | Laor | |
| 6,587,031 B1 * | 7/2003 | Daugherty et al. | 340/5.31 |
| 6,684,195 B1 | 1/2004 | Deaton et al. | |
| 6,970,837 B1 | 11/2005 | Walker et al. | |
| 2002/0120496 A1 | 8/2002 | Scroggie et al. | |
| 2003/0033292 A1 | 2/2003 | Meisel et al. | |
| 2003/0088465 A1 | 5/2003 | Monteverde | |
| 2003/0139969 A1 | 7/2003 | Scroggie et al. | |
| 2004/0243478 A1 | 12/2004 | Walker et al. | |

FOREIGN PATENT DOCUMENTS

| | | | |
|---|---|---|---|
| CA | 2217739 | 4/1996 | |
| EP | 0 085 546 A2 | 8/1983 | |
| EP | 0 512 509 A2 | 11/1992 | |
| EP | 512413 | 11/1992 | |
| EP | 0 779 587 A2 | 9/1996 | |
| EP | 0 779 587 A3 | 9/1996 | |
| EP | 0 817 138 A1 | 1/1998 | |
| EP | 0 856 812 A2 | 5/1998 | |
| EP | 0 862 150 A2 | 9/1998 | 9/2 |
| GB | 2 109 305 A | 6/1983 | |
| GB | 2 265 032 A | 9/1993 | |
| GB | 2 317 257 A | 3/1998 | 1/14 |
| JP | 58-132886 | 8/1983 | |
| JP | 2001093 A | 1/1990 | |
| JP | 2208798 A | 8/1990 | |
| JP | 4235700 A | 8/1992 | |
| JP | 5242363 A | 9/1993 | |
| JP | 6035946 | 2/1994 | |
| JP | 8-147545 | 11/1994 | |
| JP | 7065218 A | 3/1995 | |
| JP | 7078274 | 3/1995 | |
| JP | 07098779 A | 4/1995 | |
| JP | 07249176 | 9/1995 | |
| JP | 7272012 | 10/1995 | |
| JP | 8030848 A | 2/1996 | |
| JP | 08137951 | 5/1996 | |
| JP | 8-147545 | 6/1996 | |
| JP | 8221484 | 8/1996 | |
| JP | 8221645 A | 8/1996 | |
| JP | 08329323 A | 12/1996 | |
| JP | 8329323 A | 12/1996 | |
| JP | 09016836 A | 1/1997 | |
| JP | 9062908 A | 3/1997 | |
| JP | 9097288 | 4/1997 | |
| JP | 9190479 A | 7/1997 | |
| JP | H9-198554 * | 7/1997 | |
| JP | WO 97/24701 | 7/1997 | |
| JP | 10187820 | 7/1998 | |
| JP | 10214284 | 8/1998 | |
| JP | 10240830 | 9/1998 | |
| JP | 10269049 | 10/1998 | |
| JP | 10289372 A | 10/1998 | |
| JP | 11088560 | 3/1999 | |
| JP | 2003150769 | 5/2003 | |
| KR | 9503826 | 4/1995 | |
| WO | WO 95/27242 | 10/1995 | |
| WO | WO 96/32701 | 10/1996 | |
| WO | WO 97/16797 | 5/1997 | |
| WO | WO 97/08638 A1 | 6/1997 | |
| WO | WO 97/20279 | 6/1997 | |
| WO | WO 97/21200 | 6/1997 | |
| WO | WO 97/23838 | 7/1997 | |
| WO | WO 97/25684 | 7/1997 | |
| WO | WO 97/28510 | 8/1997 | |
| WO | WO 97/35441 | 9/1997 | |
| WO | WO 97/44749 | 11/1997 | |
| WO | WO 97/50064 | 12/1997 | |
| WO | WO 98/06050 | 2/1998 | |
| WO | WO 98/15907 | 4/1998 | |
| WO | WO 98/19260 | 5/1998 | |
| WO | WO 98/21713 | 5/1998 | |
| WO | WO 98/28699 | 7/1998 | |
| WO | WO 98/48388 | 10/1998 | |
| WO | WO 98/48563 | 10/1998 | |
| WO | WO 98/49658 | 11/1998 | |
| WO | WO 99/04326 | 1/1999 | |
| WO | WO 99/07121 | 2/1999 | |
| WO | WO 99/09508 | 2/1999 | |
| WO | WO 99/12117 A1 | 3/1999 | |
| WO | WO 99/38125 A1 | 7/1999 | |

OTHER PUBLICATIONS

Samuelason, Paul. Economics. McGraw Hill. 8th edition, pp. 446, 532.*
U.S. Appl. No. 11/282,525, filed Nov. 2005, Walker et al.*
"Cape Town", Reuters Ltd Reuters, Nov. 8, 1979.
"POS Spectrum: A Lottery Looks To POS For Growth", POS News, Jan. 1989, vol. 5, No. 7; p. 8; ISSN: 0896-6230.
Anne Henry, "High-tech Vending: Vending Machine OEMs Begin to Resemble THeir Consumer Electronics Counter Parets When It Comes To Rapid-fire Implementation of Technology, Original Equipment Manufacturers", Appliance, Dec. 1991, vol. 48, No. 12; p. 39; ISSN: 0003-6781.
"VendingMi$er", Optimum Energy Products Ltd.: Energy Measurement & Control, (http://www.optimumenergy.com/products/miser.htm), download date: Aug. 12, 1998.
"Notification of Transmittal of The International Search Report or The Declaration" dated Mar. 8, 2000.
Brochure, "Introducing the Digital MenuBoard", Siren Technologies, Inc., (www sirentech com).
Cook, Louise, "ConsumerWatch: Clip, Snip, Save", The Associated Press, Mar. 12, 1984, Business News Section.
Kuttner, Robert, "Computers May Turn The World Into One Big Commodities Pit", Business Week, Sep. 11, 1989, Section: Economic Viewpoint, No. 3123 at p. 17.

Schrage, Michael, "An Experiment In Economic Theory; Labs Testing Real Markets", The Record, Nov. 26, 1989, Section: Business at p. B01.

"Let's Play the Cash Register Lottery", The New York Times, Dec. 25, 1990, Section 1, p. 30, col. 4, Editorial Desk.

Nakayama, Atsushi, "Coca-Cola machines to be 'smarter'; the Teleterminal control system is aimed at keeping customers, and machines, satisfied", The Japan Economic Journal, Feb. 23, 1991, Section: Industry: Chemicals at p. 22.

Del Rosso, Laura, "Marketel says it plans to launch air fare 'auction' in June; Marketel International Inc.", Travel Weekly, Apr. 29, 1991, Section: vol. 50, No. 34, p. 1, ISSN: 0041-2082.

"Philips offers customers financing through Citicorp; Philips Medical Systems North America, Citicorp North America Inc." Health Industry Today, Jun. 1991, Section: vol. 54, No. 6, p. 4, ISSN: 0745-4678.

Pelline, Jeff, "Travelers Bidding On Airline Tickets SF firm offers chance for cut-rate fares" The San Francisco Chronicle, Aug. 19, 1991, Sections: News at p. A4.

Del Rosso, Laura, "Ticket-bidding firm closes its doors; Marketel International; Brief Article", Travel Weekly, Mar. 12, 1992, Section: vol. 51, No. 21, p. 1, ISSN: 0041-2082.

"Coupons get serious; supermarkets use barcodes to prevents misredemptions", Chain Store Age Executive with Shopping Center Age, Oct. 1992, Section: vol. 68, No. 10, p. 68, ISSN: 0193-1199.

Gilbert, Allan Z., "Operators can gain with creative merchandising.", Automatic Merchandiser, Oct. 1992, p. 80, ISSN: 1061-1797.

"Winn-Dixie/The Salvation Army Report Contributions For War Against Hunger", PR Newswire, Jun. 10, 1993, Section: Financial News.

Website: "FAQ: CSH Coke Machine Information", Institute of Information & Computing Sciences (ICS), May 23, 1994, vol. 1.2, (http //www cs uu nl/wais/html/na-dir/csh-coke-machine-info html).

Jones, Jeanne, "Data Readers Streamline Management; Scanner Technology Aids Retailers As Well As Plants, Wholesalers", The Houston Post, Jun. 26, 1994, Section: Business at p. D1.

Fiorim, Phillip, "'No Place For Penny?'/Smallest coin doesn't make cents to some", USA Today, Jul. 29, 1994, Section: News at p. 1A.

Smith, Alison, "Survey of UK Consumer Credit and Asset Finance", Financial Times, Nov. 3, 1994, Section: p. VI.

Andreoli, Tom et al., "Cash Machines Offer A Whole Lotto Money For Withdrawl; An Unfortunate Juxtaposition; Block That Metaphor!; Something Street Talk; Fishy In Springfiled; State Street Sears?; Champion As Underdog; A 'Whole Language' Graduate", Crain's Chicago Business, Jun. 19, 1995, Section: News at p. 8.

"Spain: BBV launches new card", Cards International, Jun. 22, 1995 at p. 5.

Greene, Jan, "Farm bills please assns; National Grocers Association", Supermarket News, vol. 35, Dec. 23, 1985 at p. 6.

Knippenberg, Jim, "Will local radio empires strike back?", The Cincinnati Enquirer, Jul. 23, 1995, Section: Tempo at p. F01.

Brochure, "Cyber Bid", Net Fun Ltd., Copyright 1996.

Bonnici, Joseph et al., "Consumer issues in coupon usage: An exploratory analysis", Journal of Applied Business Research, Winter 1996/1997, Section: vol. 13, No. 1, pp. 31-40, ISSN: 0892-7626, CODEN: JPBEBK.

Maras, Elliot, "Software opens doors to scientific machine menuing", Automatic Merchandiser, Feb. 1996, p. 36, ISSN: 0002-7545.

Hadley, Kimberly, "Pastors praying anti-arson effort will burn bias", The Nashville Banner, Jul. 26, 1996, Section: News at p. A13.

Gapper, John, "NatWest reports rise in bad debt", Financial Times, Jul. 31, 1996, Section: News: UK; at p. 09.

Gilbert, Allan Z., "A call to action for wireless data communication", Automatic Merchandiser, Aug. 1996, Financial Management section.

"Lynx Technology: Lynx to provide business leasing programme through Schroder Leasing", M2 Presswire, Aug. 9, 1996.

Taylor, Paul, "Towards a dream market", Financial Times (London), Sep. 4, 1996, Section: Survey—FT IT; at p. 03.

"Public Internet Kiosks, Inc. Receives First Order For Its 'Internet Station'—The Vending Machine of the Future", PR Newswire, Sep. 16, 1996.

Singletary, Michelle, "Electronic World, Unchecked Problem? U.S. Move to Paperless Payments Raises Worries About Those Who Don't Use Banks", The Washington Post, Mar. 4, 1997, Section: Financial at p. C01.

Hirschfeld, David, "Increasing Profits Through Automation", Independent Vendors Association Quarterly, Apr./May/Jun. 1997.

French, Simone A., "A Pricing Strategy to Promote Low-Fat Snack Choices through Vending Machines", American Journal of Public Health, May 1997, vol. 87, No. 5, pp. 849-851.

"Avco Financial Services", National Home Furnishing Association, (http //www homefurnish comNHFA/avco htm), download date: May 23, 1997.

Website, "Catalina Marketing Corporation", (http //catalinamktg com/prodcdir htm), download date: May 29, 1997.

Riordan, Teresa, "Patents; a novel approach to making a better spermicide harks back to some old-fashioned methods", The New York Times, Jun. 9, 1997, Section D, p. 2, col. 1, Business/Financial Desk.

Nairn, Geoff, "The key to your identity: Falling costs will allow fingerprint verification to be widely used, reports Geoff Nairn", Financial Times (London), Jul. 15, 1997, Section: Technology; at p. 12.

"The United Computer Exchange, How It All Works", (http //www uce com/howitworks html), download date: Jul. 23, 1997.

"Classified 2000: The Internet Classifieds", Classifieds2000, Inc., (http //www classifieds2000 com/cgi-cls/Display exe?C2K+aboutus), download date: Aug. 6, 1997.

"General trading information and terms provided by tradingfloor. com", (http //www tradingfloor com/info htm), download date: Aug. 14, 1997.

"NASDAQ", Information Sheet, (http //home axford com/corfin/corfl1 htm), download date: Aug. 15, 1997.

Brochure, "For the Crew & the Customer: The Best Drive-Thru & Grill Service", Olivetti North America, Winter 1998.

"VendMaster: Windows and Vending Software, Reports", (http // www vendmaster com/reports_main html), download date: Feb. 6, 1998.

"SaveSmart—How SaveSmart Works for Consumers"; (http://savesmart.com/consumer/consumer-howitworks.html), Copyright 1998, 7pp.

"Welcome to Planet U, providers of U-pons—Internet Coupons—Internet Coupons"; (http://www.webcertificate.com:443/webcert/faq-detail.asp), Copyright 1998, 8pp.

Webcertificate, the perfect gift-giving solution . . . It's quick! It's Easy! It's Secure!; (http://www.webcertificate.com:443/webcert/faq-detial.asp), Copyright 1998, 14pp.

Shop the Marketplace, 1-800-flowers.com; (http://www.1800flowers.com/flowers/welcome.asp), Copyright 1998, 4pp.

"The Leader in Internet Shopping Systems for Supermarkets and Drug Stores", groceries online, copyright 1996 Groceries Online, Inc. (http://www.groceries-online.com/), Copyright 1996, 4pp.

"Brother Industries is pushing ahead with its new PC software . . . ", IDC Japan Report, Aug. 30, 1991, Section: vol. 17, p. 53, 1pg.

Maras, Elliot, "1995: downsizing adds costs; new strategies sought", Automatic Merchandiser, Aug. 1996, pp. 20-22, 24, 26, 28, 30, 32, 34, 36, 38, 40 and 44 (13pp.).

Naik, Gautam, "In Digital Dorm, Click on Return for Soda", The Wall Street Journal, Jan. 23, 1997, Section: Online, p. B1, 3pp.

Shea, Barbara, "Read Fine Print When Comparing Car Rentals", Feb. 9, 1997, St. Louis Post-Dispatch, Section: Travel & Leisure, p. 04T, 2 pp.

Website: "CSH Drink Machine(s)", (http //www csh rit edu/proj/drink html), download date: Jan. 29, 1998, 2pp.

Desjardins, Doug, "Hollywood's Investment in Online Video Retailer Gets Mixed Reviews", Video Store, Aug. 9, 1998, Section: p. 1, ISSN: 0195-1750, 3pp.

Stigler, George J., "The Theory of Price", The Macmillan Company, Copyright 1952, pp. 82-94, 214-221 (14pp.).

Bowman, Jr., Ward S., "Tying Arrangements and the Leverage Problem", The Yale Law Journal, Nov. 1957, vol. 67, No. 1, pp. 19-36 (10pp.).

Stigler, George J., "The Theory of Price", The Macmillan Company, Third Edition, Copyright 1966, pp. 82-94, 208-215 (8pp.).

Narasimhan, Chakravarthi, "A Price Discrimination Theory of Coupons", Marketing Science, Spring 1984, vol. 3, No. 2, pp. 128-147 (20pp.).

Judith Evans, "Who was that masked Cybershopper?; MasterCard-Visa Agreement on Credit Card security may make On-Line commerce fly", The Washington Post, View Related Topics; Feb. 2, 1996, Final Edition; Section: Financial; p. F01, 2pp.

"First Virtual Holdings Releases Beta Software for Secure Transactions on Microsoft Merchant Server", PR Newswire, Mar. 31, 1997; Section: Financial News, 2pp.

"Six vendors sign on for early electronic commerce venture", Phillips Business Informaion, Inc. Voice Technology News, Dec. 13, 1994; No. 25, vol. 6; ISSN: 1045-1498, 2pp.

"The easy, pain-free way to buy or lease your next car", What is autoseek; (http://www.autoseek.com/#what) download date: May 28, 1997, 4pp.

Nora Lockwood Tooher, "Macy's new gift card gets trial run in Warwick", The Providence Journal-Bulletin: Oct. 1, 1998; Section: Business; p. 1E, 2pp.

Denise Caruso, "Digital Commerce; The boom in on-line shopping adds a twist to the old quandary of how to tax interstate purchases", The New York Times, View Related Topics, Dec. 28, 1998; Late Edition—Final; Section: C; p. 3; col. 5; Business/Financial Desk, 3pp.

Godwin, Nadine, "New software was key lure in $17 million agency buyout.", Travel Weekly, Nov. 26, 1984, Section: vol. 43, p. 45, ISSN: 0041-2082, 4pp.

"Woodside Management Systems Inc. today announced . . . ", PR Newswire, Apr. 1, 1986, 2pp.

Tellis, Gerard J., "Beyond the Many Faces of Price: An Integration of Pricing Strategies", Journal of Marketing, Oct. 1986, vol. 50, pp. 146-160, 15pp.

Godwin, Nadine, "Agency, funded by 3M, set to market software; Travelmation touts trip planner to corporations; designed to eliminate client-agent telephone calls; Business Travel Update", Travel Weekly, Oct. 13, 1986, Section vol. 45, p. 45, ISSN: 0041-2082, 4pp.

Godwin, Nadine, "Agency dates to launch its own air res system; Travelmation system provides greater versatility, Automation Report", Travel Weekly, Oct. 23, 1986, 5pp.

"Thomas Cook Travel U.S.A. has announced . . . ", PR Newswire, Jan. 12, 1987, 2pp.

Bawa, Kapil et al., "The Coupon-Prone Consumer: some Findings Based on Purchase Behavior Across Product Classes", Journal of Marketing, Oct. 1987, vol. 51, pp. 99-110, 12pp.

Nomani Sr., A., "Air Crashes Stir Signs of Anxiety in Travelers", Wall Street Journal, Aug. 1, 1989, Section 2, p. 1, col. 1, 2pp.

Carlsen, Clifford, "From Airline Tickets to Human Organs, the Electronic Markets are Booming", San Francisco Business Times, Aug. 14, 1989, Section: vol. 3, No. 50, Section 1, p. 17, 2pp.

Golden, Fran, "AAL's Riga doubts Marketel's appeal to retailers", Travel Weekly, Nov. 13, 1989, Section: vol. 48, No. 91, p. 4, ISSN: 0041-2082, 2pp.

"Letters to BusinessExtra", The San Francisco Chronicle, Dec. 26, 1989, Section: Business, C7, 3pp.

Wallace, David, "Company Planning to Let Flyers bid on Airfares", Philadelphia Business Journal, Mar. 26, 1990, Section: vol. 9, No. 3, Section 1, p. 15, 3pp.

Greenberg, Peter S., "The Savvy Traveler: Lower Air Fares For Consumers Not in the Cards . . . " Los Angeles Times, Jul. 8, 1990, Section: Travel, Part L, p. 2, col. 1, Travel Peak, 2pp.

Carey, Christopher, "Firm Offers Auction for Airline Tickets", St. Louis Post-Dispatch, Aug. 7, 1991, Section: Business, p. 1B, 2pp.

Upton, Kim, "News and Briefs: French Say Monoliths Off-Limits to Visitors", Los Angeles Times, Aug. 25, 1991, Section: Travel, Part L, p. 4, col. 1, Travel Desk, 2pp.

"Buy Low, Fly High", USA Today, Nov. 14, 1991, Section: Bonus, p. 15, 2pp.

Feldman, Joan M., "To rein in those CRSs; computer reservation systems" Air Transport World, Dec. 1991, Section: vol. 28, No. 12, p. 89, ISSN: 0002-2543, 5pp.

"Traveler's Notes; Bookit Report", Consumers Reports Travel Letter, Dec. 1991, Section: vol. 7, No. 12, p. 143, 1 pg.

"CRTL's Blue Ribbon Deals for 1992", Consumer Reports Travel Letter, Jan. 1992, Section: vol. 8, No. 1, pp. 3-5, 2pp.

"Newsletters", The Atlanta Journal and Constitution, Mar. 1, 1992, Section: Travel: Section K, p. 13, 1pg.

Del Rosso, Laura, "Ticket-bidding firm closes its doors, Marketel International", Travel Weekly, Mar. 12, 1992, Section: vol. 51, No. 21, p. 1, ISSN: 0041-2082, 2pp.

Hainer, Cathy et al., "Where vacationing kids get good care", USA Today, Apr. 1, 1992, Section: Life, p. 4D, 2pp.

Weatherford, Lawrence R. and Bodily, Samuel E., "A Taxonomy and Research Overview of Perishable-Asset Revenue Management: Yield Management, Overbooking, and Pricing", Operations Research, Sep.-Oct. 1992, vol. 40, No. 5, pp. 831-844, 14pp.

Spencer, Milton H. and Amos, Jr., Orley, M., "Contemporary Economics, Eight Edition", Worth Publishers, Copyright 1993, 5pp.

Rajendran, K.N. and Tellis, Gerard J., "Contextual and Temporal Components of Reference Price", Journal of Marketing, Jan. 1994, pp. 22-34 (13pp.).

Feldman, Joan M., "Reclaiming control; new software to close gap between projected and actual revenues", Aug. 1995, Section: vol. 32, No. 8, p. 35, ISSN: 0002-2543, 5pp.

*United States* v. *Eastman Kodak Co.*, United States Court of Appeals for the Second Circuit, decided Aug. 4, 1995, 16pp.

Bronnenberg, Bart J., "Limited Choice Sets, Local Price Response, and Implied Measures of Price Competition", Journal of Marketing Research, Spring 1996, Section: vol. XXXIII, p. 163, 20pp.

Prentice, Michael, "Searching for the lowest fare: Getting the lowest fare takes work, buts it's worth the effort", The Ottawa Citizen, Oct. 9, 1996, Section: Citylife; Consuming Passion, p. C3, 3pp.

"Auctioning unsold airline tickets", Insight (USA), download date: Oct. 29, 1996, 1pg.

"Web Ventures presents Bookit!", (http www webventures com/bookit), Copyright 1996, 1pg.

"Salomon Brother's Maldutis Says Internet is Aviation's 'Third Revolution;' Will Earn Billions", World Airline News, Mar. 21, 1997, Section: vol. 7, No. 12, 2pp.

Feldman, Joan M., "Pricing and cybersales; Internet airline ticket sales and reservations", Feb. 1998, Section: No. 2, vol. 35, p. 64, ISSN: 0002-2543, 4pp.

Adyanthaya, Surain, "Revenue Management: the Black Art." Interavia Business & Technology, Sep. 1998, Section: No. 623, vol. 53, p. 43, ISSN: 0983-1592, 4pp.

"Airfare Bargains on the Net: About E-mail Lists", (http //travel epicurious com/travel/c_planning/02_airfares/email/intro html), Copyright 1998, 17pp.

"Airtech—FlightPass Faq", (http //www airtech com/at_flightpass/at_faqflightpass htm), download date: Oct. 5, 1998, 4pp.

Varian, Hal R., "First Monday: Differential Pricing and Efficiency", (http www firstmonday dk/issues/issue2/different/), Copyright 1996, 18pp.

Kephart, Jeff, "Price Dynamics of Vertically; Introduction", (http //www research ibm com/infoecon...), Aug. 15, 1998, 3pp.

"Bookit Airfare Bidding System (Fax for Your Plane Ticket?)", Consumer Reports Travel Letter, Sep. 1991, Section: vol. 7, No. 9, pp. 97, 106, 3pp.

Nelson, Janet, "Practical Traveler; Airlines Relaxing Policy On No-Refund Tickets", The New York Times, Sep. 22, 1991, Section 5, p. 3, col. 1, Travel Desk, 4pp.

"Traveler's Notes; Easier Airfare Bidding.", Consumer Reports Travel Letter, Oct. 1991, Section: vol. 7, No. 10, p. 119, 1pg.

Website: VendMaster, "Windows for Vending PRO with Inventory", (http //www vendmaster com/pro_inv_main html), download date: Jul. 16, 1998, 2pp.

Website: Optimum Energy Group—Products, "VendingMi$er", (http //www optimumenergy com/products/miser html), download date: Aug. 12, 1998, 2pp.

Burke, Raymond R., "Virtual Shopping: Breakthrough in Marketing Research", Harvard Business Review, Mar.-Apr. 1996, pp. 120-131, 9pp.

PCT International Search Report for Application No. PCT/NO95/00060, dated Oct. 10, 1995, 3pp.

Rehayem, Gilbert, "Opinion: X-Press Betting", La Fleur's Lottery World, Feb. 7, 1997, 1pg.

"Save the mark", Financial Times (London), Feb. 1, 1983, Section 1, Men & Matters at p. 12, 1pg.
PCT International Search Report for Application No. PCT/US98/21216, dated May 4, 1999, 4pp.
Office Action for U.S. Appl. No. 09/348,566, mailed Oct. 1, 2003, pp. 3-5.
Anthony Joseph, "Baby the engine, and other saving tips", The Christian Science Monitor, Nov. 4, 1986, p. B10, 3p.
"Coupons & more", welcome to coolsavings.com—Copyright 1996-1999.(http://208,134.230.42/cgi-win/tempprs.exe/first.htm), 3pp.
"A personal shopping organizer for the web savvy consumer. My KillerApp offers a personalized shopping experience to meet the unique needs of every individual user", (http://www.killerapp.com/html/main/pr0004.html), Oct. 2, 1998, 2pp.
"New Wave Marketing", Promotion Times, An SCA Quarterly Newsletter—First Quarter, undated, 2pp.
Brochure: "Reaching In New Directions", First Data Corp., Merchant Services, undated, 31pp.
"Global, Second-Generation, and Frequent-Buyer Set New Trends", Marketing News, Jun. 7, 1985, vol. 19, No. 12, p. 18, ISSN: 0025-3790, 1pg.
Lacher, Lisa, "Coupon Gimmick Registers Profits", Business Dateline, Business Record, Dec. 7, 1987, vol. 83, No. 47, Section 1, 2pp.
Stevens, Lawrence, "Hypermarket Challenge", Computerworld, Dec. 19, 1988, Section: Software & Services, 2pp.
McIntyre, Faye, "Small business may prefer alternatives to advertising.", South Dakota Business Review, Jun. 1989, vol. 47, No. 4, p. 1(4), ISSN: 0038-3260, 4pp.
"Safeway Introduces Store-Generated Coupons", PR Newswire, May 1, 1990, 1pg.
Ramirez, Anthony, "The Pizza Version of Dialing '911'", The New York Times, Sep. 9, 1991, Late Edition—Final, Section D, p. 1, col. 3, Financial Desk, 4pp.
Blattenberg, Robert C., "Interactive marketing: exploiting the age of addressability.", Sloan Management Review, Sep. 22, 1991, Section: vol. 33, No. 1, p. 5, ISSN: 0019-848X, 15pp.
O'Kane, Gerry, "Parking your car by computer", South China Morning Post, Mar. 23, 1993, Section: Supplement at p. 3, 3pp.
McDowell, Bill, "Frequency marketing builds repeat business; Management", Information Access Company, a Thomsen Corporation Company, Reed Publishing USA, Building Supply Home Centers, Aug. 1993, No. 2, vol. 165, p. 96, ISSN: 0890-9008, 5pp.
Arend, Mark, "Debit frenzy? Not quite, but getting there", ABA Banking Journal, Apr. 1994, vol. 86, No. 4, pp. 57-61, ISSN: 0194-5947, 4pp.
Rubel, Chad, "Young firm armed with technology fights an old giant; ETM to Ticketmaster: Let's rock", American Marketing Association, Marketing News TM, Jun. 19, 1995, 3pp.
"Tecmark Reward Terminal", Tecmark Services, Inc., Copyright 1996, (http //www tecmarkinc com/terminal htm), 1pg.
McKinney, Jeff, "Merchant program could pay off for Provident", The Cincinnati Enquirer, Mar. 24, 1996, Section: Financial at p. E02, 2pp.
"Staples The Office Superstore to Participate in Visa 'Rewards for Your Home' Promotion; Savings will be offered to thousands of Visa Staples customers.", Business Wire, Mar. 25, 1996, p. 3251164, 2pp.
Retailers in small N.D. town join forces (Discount Points Corp launches Discount Points, a multi-retailer consumer discount program), Tire Business, Apr. 29, 1996, vol. 14, No. 2, p. 10, 3pp.
Wagner, Jim, "Cameras Tell Mall What Door You Use, How Often You Go", Albuquerque Tribune, Aug. 9, 1996, Section: Evening, 2pp.
Ficksencher, Lisa, "Amex to Start Free Rewards Program with Discounts on Merchandise", The American Banker, Oct. 18, 1996, Section: Credit/Debit/ATMS at p. 10, 2pp.
Fitzgerald, Kate, "Amex Program Moves Loyalty To Next Level: Custom Extras Finds A Medium Customers Can't Ignore: Billing Statements", Crain Communications Inc., Advertising Age, Nov. 4, 1996, Section: News, 2pp.
"Click this box for extra pepperoni; CyberSlice routes online orders", The Dallas Morning News, Dec. 2, 1996, Section: Business, 2pp.
"Frequent shopper programs are taking off.", Grocery Marketing, Jan. 1997, vol. 63, No. 1, p. 54, 2pp.

Fickenscher, Lisa, "Merchant: American Express Seeks to Mine Its Data on Cardholder Spending Patterns", The American Banker, Mar. 24, 1997, Section: Credit/Debit/ATMS at p. 20, 2pp.
"Dispensing the future", Lafferty Publications Limited, Electronic Payments International, May 1997, Section: Feature at p. 12, 5pp.
"Grocery shopping goes on line in many markets; Technology spurs remote ordering concept", The Dallas Morning News, May 12, 1997, Section: Business at p. 2D, 2pp.
"Industry Briefs", Phillips Business Information, Inc., Card News, Jun. 9, 1997, vol. 12, No. 11, 2pp.
Popyk, Bob, "Turn customers into torchbearers", Information Access Company, a Thomson Corporation Company, National Trade Publications, Boating Industry, Sep. 1997, No. 9, vol. 60, p. 33, ISSN: 0006-5404, 3pp.
Hoeschen, Brad, "Brookfield Square hopes mall card strikes a chord", The Business Journal of Milwaukee Inc., Business Dateline, Business Journal-Milwaukee, Sep. 12, 1997, vol. 14, No. 50 at p. 19, 2pp.
"Acxiom Case-in-Point Case Study—Bloomingdale's Inc.", "Pushing Technology's Edge Upscale department store applies database for profit", (http //www acxiom com/cip-cs-b htm), download date: Sep. 23, 1997, 2pp.
"NCR 7452 Workstation—Beyond Traditional POS", (http //www ncr com/product/retail/products/catalog/7452 shtml), download date: Sep. 23, 1997, 3pp.
"From Our Family to Yours . . . 5 Weeks of Coupon Values for a Valuable Customer", Shoprite, Wakefern Food Corporation, Copyright 1998, 1pg.
Heller, Al, "Chain Pharmacy: Forecast '98: New Technology Advances Pharmacy Productivity", Lebhar-Friedman Inc., Drug Store News, Jan. 12, 1998 at p. CP29, 3pp.
"Advanced Mechanics Internet Specials", (http //www metroplexweb com/advcpn2 htm), download date: Mar. 12, 1998. 2pp.
Website: "New Partners, more exciting rewards: The Membership Rewards program for 1998.", (http //www americanexpress com/rewards/news/docs/1998new_mr shtml), download date: Mar. 12, 1998, 38pp.
Website: "U.P.C. Coupon Code Guidelines Manual", (http //www uc-council org/d31-3 htm), download date: Mar. 12, 1998, 10pp.
Rubinstein, Ed, "Internet Continues To Fortify Takeout Sector For Operators", Lebhar-Friedman Inc., Nation's Restaurant News, Mar. 23, 1998 at p. 55, 5pp.
Information Packet: "My Points®—Universal Rewards Currency", MotivationNet, Inc. Apr. 1998, 29pp.
Hemsley, Steve, "Research and destroy; Point-of-purchase research provides brand managers . . . ", Centaur Communications Ltd., Marketing Week, Apr. 16, 1998, Section: Point Of Purchase at pp. 33-36, (3pp).
"WellsPark Group Lauches 'V.I.P. Rewards'; the Most Comprehensive Relationship Marketing Program Ever Created by a Mall Developer", Business Wire, Inc., May 19, 1998, 2pp.
"Catching Red Light Runners", Business Communications Company, Advanced Transportation Technology News, Jun. 1998, vol. 5, No. 2, 2pp.
Amato-McCoy, Deena, "Co-Branded Acme Credit Card Rewards Loyal Users", Information Access Company, A Thomson Corporation Company, Capital Cities Media Inc., Supermarket News, Jun. 15, 1998, p. 17, ISSN: 0039-5803, 2pp.
"Acme Markets, U.S. Bancorp Debut visa Rewards Card", Phillips Business Information, Inc., Card News, Jun. 22, 1998, vol. 13, No. 12, 1pg.
Rubinstein, Ed, "Technology: Prepaid program lets Galleria guests dine 'a la Card'", Nation's Restaurant News, (http //www nrn com), Jun. 29, 1998, 1pg.
"DataCard Partners With CSI To Offer Card-Based Loyalty Solution To Merchants", Business Wire, Inc., Jul. 9, 1998, 1pg.
Albright, Mark, "Grocery savings via Web coupons", Times Publishing Company, St. Petersburg Times, Jul. 22, 1998, Section: Business at p. 1E, 2pp.
Campos, Frellie, "Discount shopping program extended to residents.", Pacific Business News, Sep. 21, 1998, vol. 36, Issue 27, p. 32, 3/5p, ISSN: 0030-8552, 3pp.

"Garage management needs", "Unit Tracking with The General Manager Professional", (http www dacobusy com/garage/idxgarg htm), download date: Mar. 16, 1999, 2pp.

"Route Sales Automation—Track customers, orders, sales, and inventory! Route accounting, . . . ", "Point of sale system carried in the palm of your hand", (http //www dacobusy com/), download date: Mar. 16, 1999, 1pg.

"Alphatech, Inc., Looking To The Future", (http //www alphatech com/), download date: Mar. 25, 1999, 1pg.

"Alphatech: Technologies and Projects", (http //www alphatech com/secondary/techpro/compvis html), download date: Mar. 25, 1999, 1pg.

"IMPS: Vehicle License Plate Recognition System", "IMPS™ Integrated Multi-Pass System State of the Art Vehicle License Plate Recognition System", (http www singapore com/optasia/imps), download date: Mar. 25, 1999, 3pp.

"MSTAR main", "Moving and Stationary Target Acquisition and Recognition (MSTAR)", (http www alphatech com/secondary/techpro/projects/mstar/MSTAR_TopLevel html), download date: Mar. 25, 1999, 2pp.

"Welcome to Q Lube!", (http //www qlube com/), download date: Mar. 25, 1999, 1pg.

PCT Notification of Transmittal of the International Search Report or the Declaration for PCT/US99/22650, Dated Mar. 16, 2000, 10pp.

PCT Notification of Transmittal of the International Search Report or the Declaration for PCT/US99/21720, Dated Mar. 23, 2000, 7pp.

Website: "Pricing, The Professional Pricing Society Conference Agenda", (http //www pricing-advisor com/conf_agn htm), download date: Jun. 19, 1999, 10pp.

Press Release, "Priceline.com Delivers Savings For Flexible Travelers In Side-By-Side Price Compairson", Priceline.com, Stamford, CT, May 28, 1999, 4pp.

"Travel Industry Bellwether for All Commerce Players", Jupiter Communications, Copyright 1999, Jupiter Strategic Planning Services, 2pp.

"Circuit City to Integrate E-Commerce with store shopping; retailer's E-superstore—www.circuitry.com- to Open in July", PR Newswire, Jun. 15, 1999; Section: Financial News, 3pp.

"Wal-Mart vs. Amazon: The fight begins"; Yahoo News, Jun. 9, 1999, 3pp.

"Mercata—Group Buying Power", (http://www.mercata.com/cgi-bin/mercata/mercata/v1/pages/home.jsp), download date: Jun. 7, 1999, 5pp.

David Lazarus, "E-Commerce, Japanese style", Wired online page, Jun. 7, 1999, 3pp.

"Kmart expands inventory via in-store kiosks", Jun. 20, 1999, RTNews; (www.retailtech.com), 1pg.

"WebVoucher", (www.pinex.co.uk/webvoucher/), download date: Mar. 14, 1999, 2pp.

Quinn, Jane Bryant, "New Cars for Less", Newsweek; Oct. 23, 1978; Section: The Columnists; p. 80, 2pp.

"My Auto Broker—Online Auto Broker", (http://www.adverlink.com/myautobroker/), download date: May 28, 1997, 4pp.

Hilts, Paul, "Technology meets commerce; electronic publishing; includes articles on the World Wide Web and the annual Military Book Show; ABA '96", Publisher's Weekly, vol. 243; No. 28; p. 43; ISSN: 0000-0019, 4pp.

"About CyberSlice", (http://www.cyberslice.com/cgi-bin/WebObjects/CyberSlice:2@httpserv01/), download date: May 6, 1997, 2pp.

"PriceWatch", (http://icon.co.za/-robo/prod01.htm), Jan. 14, 1997, 5pp.

PCT International Search Report for Application No. PCT/US97/13588, dated Dec. 4, 1997, 2pp.

Hennry, Anne, "High-tech vending: vending machine OEMs begin to resemble their consumer electronics counter parts when it comes to rapid-fire implementation of technology; original equipment manufacturers", Appliance, Dec. 1991, Section: vol. 48, No. 12, p. 39, ISSN: 0003-6781, 5pp.

Davis, Tim "Vending suppliers scurry to meet Coke-Mandated vendor communication", Automatic Merchandiser, Dec. 1992, pp. 62-64, 2pp.

Kohda, Youji, Endo, Susumu, "Ubiquitous Advertising on the WWW: Merging Advertisement on the Browser", Computer Networks and SDN Systems 28, May 1, 1996 at pp. 1493-1499, 8pp.

"Coupon acceptor; Coinco", Beverage Industry, Jul. 1998, No. 7, vol. 89, p. 38, 2pp.

"Coinco offers BA-30 dollar bill acceptor", Automatic Merchandiser, Aug. 1998, p. 43, 2pp.

Conlon et al. "Press 1 for profit." Sales and Marketing Management, Sep. 1998, 6pp.

Rich Karlgaard, "Keep your eyes on the prize", Forbes, Sep. 21, 1998, p. 43, 3pp.

PCT International Search Report for Application PCT/US98/21216, dated May 4, 1999, 4pp.

PCT International Search Report for Application No. PCT/US00/13349, dated Nov. 9, 2000, 5pp.

Burke, Raymond R. "Do You See What I See? The Future of Virtual Shopping." Journal of the Academy of Marketing Science, vol. 25, No. 4, pp. 352-360, Fall 1997, 17pp.

Office Action for U.S. Appl. No. 11/456,342 dated Sep. 14, 2007, 6pp.

Office Action for U.S. Appl. No. 09/345,092 dated Jan. 24, 2002, 37pp.

Office Action for U.S. Appl. No. 09/345,092 dated Mar. 15, 2001, 33pp.

Office Action for U.S. Appl. No. 09/345,092 dated Oct. 22, 2002, 42pp.

Office Action for U.S. Appl. No. 09/345,092 dated Jul. 1, 2005, 17pp.

Office Action for U.S. Appl. No. 09/345,092 dated Mar. 10, 2006, 8pp.

Office Action for U.S. Appl. No. 09/345,092 dated Aug. 29, 2006, 12pp.

Notice of Allowability for U.S. Appl. No. 09/345,092 dated Sep. 29, 2006, 4pp.

Notice of Allowability for U.S. Appl. No. 09/345,092 dated Mar. 1, 2007, 4pp.

Office Action for U.S. Appl. No. 09/345,092 dated Jun. 15, 2007, 2pp.

International Search Report for Application No. PCT/US04/33811 dated Dec. 13, 2005, 3pp.

Written Opinion for Application No. PCT/US04/33811 dated Dec. 13, 2005, 3pp.

Office Action for U.S. Appl. No. 10/095,372 dated Aug. 26, 2005, 12pp.

Office Action for U.S. Appl. No. 10/095,372 dated Mar. 4, 2005, 8pp.

Office Action for U.S. Appl. No. 09/348,566, mailed Oct. 1, 2003, pp. 3-5, 3pp.

* cited by examiner

| PRODUCT IDENTIFIER 210 | CATEGORY IDENTIFIER 212 | DISPENSER IDENTIFIER 214 | AVAILABLE INVENTORY 216 | DATE STOCKED 218 | EXPIRATION DATE 220 | SALES RATE 224 | RETAIL PRICE 226 | MINIMUM ACCEPTABLE PRICE 230 |
|---|---|---|---|---|---|---|---|---|
| BBQ POTATO CHIPS | SNACK | S1 | 2 | 12/1/98 | 1/30/99 | 1 | $0.50 | $0.50 |
| BBQ POTATO CHIPS | SNACK | S1 | 10 | 12/6/98 | 2/6/99 | 1 | $0.50 | $0.20 |
| BAKED COOKIES | SNACK | S4 | 12 | 12/1/98 | 1/20/99 | 5 | $0.40 | $0.40 |
| THUMBS UP SODA | DRINK | B2 | 4 | 12/1/98 | 1/10/99 | 1 | $0.75 | $0.75 |
| REGULAR BRAND COLA | DRINK | B6 | 8 | 12/1/98 | 1/7/99 | 6 | $0.75 | $0.45 |
| BEET'S FRUIT JUICE | DRINK | B8 | 13 | 12/1/98 | 1/6/99 | 1 | $0.70 | $0.25 |

METHOD AND APPARATUS FOR VENDING PRODUCTS

CROSS-REFERENCE TO RELATED CORRESPONDING APPLICATIONS

This is a continuation-in-part of commonly owned, U.S. patent application Ser. No. 09/012,163 entitled "Method and Apparatus for Automatically Vending a Combination of Products" filed Jan. 22, 1998 now U.S. Pat. No. 6,397,193, commonly owned, U.S. patent application Ser. No. 08/920,116 entitled "Method and Systems for Processing Supplementary Product Sales at a Point-of-Sale Terminal" filed Aug. 26, 1997 now U.S. Pat. No. 6,119,099, and commonly owned, co-pending U.S. patent application Ser. No. 08/947,798 entitled "Method and Apparatus for Dynamically Managing Vending Machine Inventory Prices" filed Oct. 10, 1997, the entirety of each incorporated by reference herein.

BACKGROUND OF THE INVENTION

1. Field of the Invention

The present invention is directed generally to vending machines and, more particularly, to a method and apparatus for advancing the sale of vending machine products by offering and selling discounted products, the identities of the discounted products being revealed after receipt of payment.

2. Description of the Related Art

It is believed that the first modern vending machine was installed in the late 1880s. The first vending machines were rudimentary devices primarily designed to dispense cigarettes and postcards. Modern vending machines are employed to store and dispense a vast array of merchandise in response to a consumer request and appropriate payment. Such merchandise includes products such as drinks, candy, frozen deserts, snacks, video tapes and children's toys.

Many entrepreneurs are attracted to the basic concept of selling products using a vending machine. Vending machines are generally considered to have significant advantages over traditional merchandising methods. Specifically, vending machines enable the automated sale of merchandise at unconventional locations and times, and require no sales personnel to sell products.

Prior vending machines, however, have several disadvantages when compared to traditional merchandising, particularly relating to inventory control and pricing. With respect to inventory control, one disadvantage is the difficulty of selling or "turning over" an inventory of items that are of low demand, of inferior quality, and/or which are perishable. Although some vending machine suppliers offer to buy back inventory from operators who no longer want to sell certain products, in order to mitigate revenue loss such suppliers often fail to live up to their offer when an operator tries to exercise this option.

Quantity Discounts

There have been various attempts to improve inventory turnover using vending machines that encourage consumers to buy larger quantities of a product. Such attempts, as disclosed in patents such as U.S. Pat. Nos. 4,008,792; 4,498,570; and 4,679,150 have advanced the art by providing various means that enable a consumer to purchase a product at a quantity discount. These advancements may advantageously encourage additional purchases of an item at a vending machine, but they are likely to affect only consumers who can utilize multiple units of the same product. Further, these inventions do not address the broader problem of improving sales of low demand, low quality or perishable products.

Complementary Products

Some operators have addressed inventory and price management problems by selling complementary products, such as chips and soda, from the same machine. By selling complementary products, operators hope to passively induce consumers to purchase lower demand products, as certain snacks may be, by placing them in proximity to higher demand products, as certain sodas (e.g. COCA-COLA) may be. Operators may also use this technique to indirectly pair highly profitable products with less profitable ones. The passive nature of this technique, however, limits its effectiveness. Because conventional vending machines do not employ sales personnel, consumers presently are not actively persuaded to purchase low demand or perishable products.

Inventory Analysis and Control

Other attempts to address problems associated with inventory control include inventory analysis products that employ a proactive approach. These products assist operators in deciding what products to stock, when to restock and at what quantities. Systems, such as a software product entitled "Windows for Vending PRO with Inventory" by Vendmaster and a system described in U.S. Pat. No. 4,654,800 to Hayashi, have been designed to report product sales data. VendMaster's product is intended to enhance a vending machine operator's ability to identify high-demand inventory and determine preferable times to stock the machine. There have also been attempts to address inventory control problems through systems that enable operators to remotely monitor inventory and remotely retrieve sales data, such as the system described by U.S. Pat. No. 4,412,292 to Sedam et al.

The aforementioned solutions generally attempt to solve inventory problems by allowing operators to monitor and analyze raw sales data. These solutions fail to adequately address the aforementioned shortcomings of present vending machines. Specifically, these prior systems fail to provide adequate solutions to the problems of maintaining an inventory of perishable items; increasing inventory turnover; and recovering the investment in low demand or inferior quality items.

Another attempt to address problems associated with inventory control is described in U.S. Pat. No. 5,685,435 to Picioccio. The Picioccio patent is directed to a bulk vending machine having bins that can be used to dispense product mixes selected by a consumer. A "mystery" blend option is also available. Upon selection of the mystery blend option, the vending machine selects a product mix from the available products in accordance with inventory management practices. The consumer receives the same quantity of product at the same price that would have been paid had the mystery option not been selected. As such, this attempt fails to actively promote the sale of low demand, perishable and less profitable products through any form of reducing pricing schedule and/or perishable product expiration date analysis.

Others have attempted to address problems associated with expiring vending machine products. Such attempts have focused on limiting the sale of expired vending machine products. As such, these attempts have not actively promoted the sale of such products through the use of expiration dates to determine a product's price on a dynamically changing basis. For example, in a product developed by Automated Vending of America, Sunkist Growers, Inc. and Cavalier known as "The Sunkist Peeled Citrus Machine", a bar code system is used to prevent dispensing of fruit after its 16 day shelf life.

This system does not however make any attempt to advance the sale of products as they approach the end of their shelf life.

A need therefore exists for a method and apparatus that addresses these deficiencies of prior systems. In particular, a need exists for a method and apparatus that monitors supply and demand of a vending machine inventory and that encourages consumers to purchase low demand, perishable and less profitable products. Further, a need exists for a method and apparatus that determines and dispenses a product based on a monetary amount received from a consumer. The present invention addresses such problems by providing an apparatus and processing approach that have not previously been proposed.

SUMMARY OF THE INVENTION

Generally, according to one aspect of the invention, a method and apparatus are disclosed for offering and selling a product from a vending machine. It is an object of the present invention to provide a method and system that actively promotes the sale of low-demand and expiring products.

In accordance with the method of present invention, a database of product data is maintained. The product data includes retail price data and minimum acceptable price data for each of the products sold by a vending machine. The method includes identifying a monetary value available for purchasing a product.

The method further includes a step of selecting a product from among the products in the database based on the monetary value and the minimum acceptable price data associated with the selected product. An offer of the product is output to a consumer via an output device, without revealing the identity of the selected product. The vending machine determines whether the consumer accepts the offer, and if the consumer accepts the offer, the product is dispensed, thereby revealing the identity of the product to the consumer.

A more complete understanding of the present invention, as well as further features and advantages of the present invention, will be obtained by reference to the following detailed description and drawings.

BRIEF DESCRIPTION OF THE DRAWINGS

A more complete appreciation of the invention and many of the attendant advantages thereof may be readily obtained by reference to the following detailed description when considered with the accompanying drawings, wherein:

FIG. 2 depicts an exemplary inventory management table stored in the memory of the vending machine of FIG. 1;

DETAILED DESCRIPTION

Definitions

For the purposes of this specification, the following terms will have the corresponding definitions:

| | |
|---|---|
| Optimal Product: | A product which is selected, based on one or more criteria, for sale to the consumer as a mystery product. |
| Product Category: | A product classification for merchandise, such as soda, candy, fruit or musical disc. |
| Product Identifier: | Specific product information, such as a product trademark or a code, which uniquely distinguishes a particular product from other products within a product category. |
| Retail Price: | A pre-defined price set by a vending machine operator, which is a standard (undiscounted) price at which an item is to be sold. |
| Selected Product: | A specific product selected by a consumer in a vending machine transaction. |
| Upsell Product: | A second product offered to a consumer for an additional charge, after the consumer has selected a first product. |

Apparatus Architecture

Figure 1:
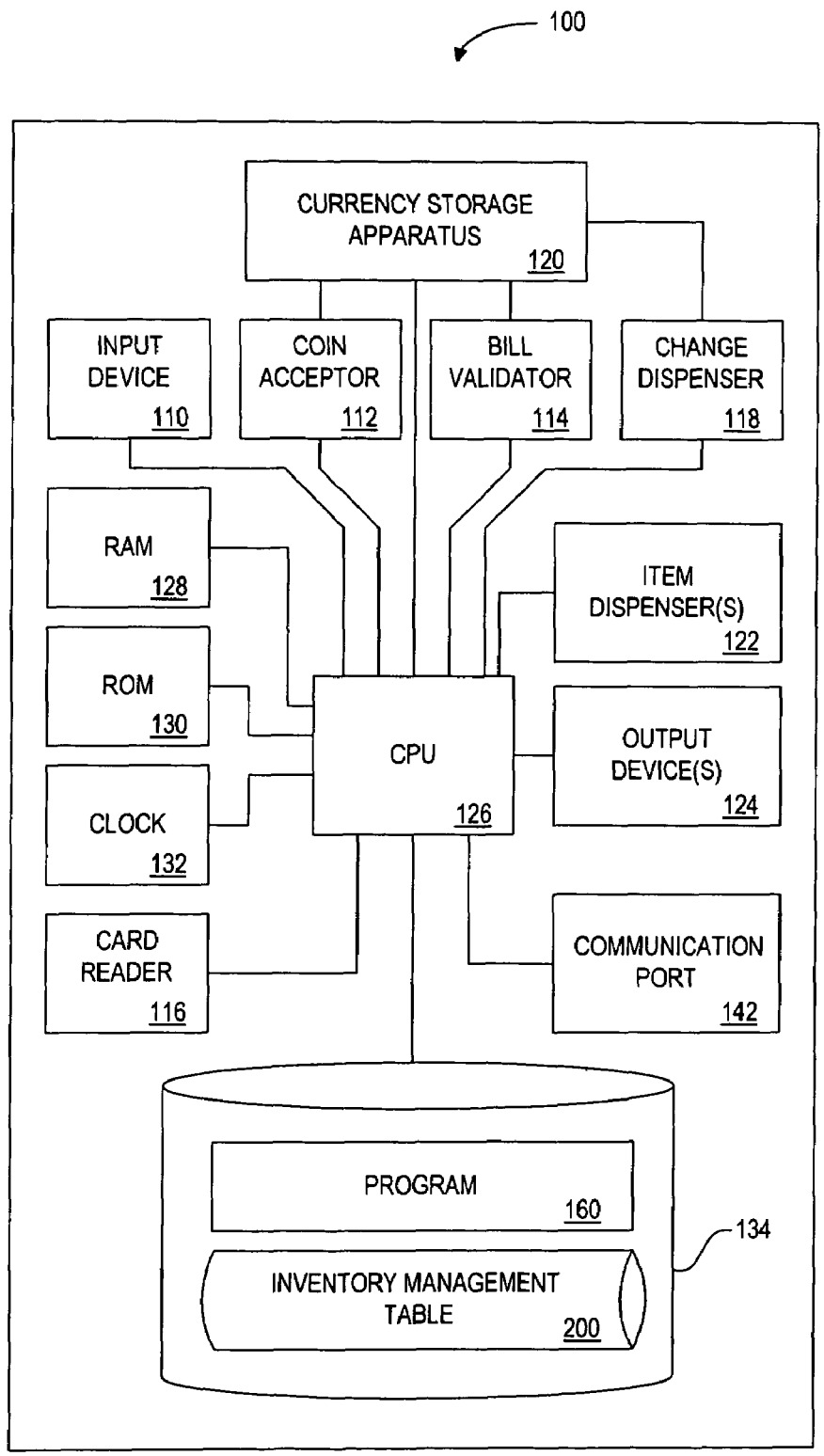
FIG. 1 is a schematic block diagram illustrating the components of a vending machine according to one embodiment of the present invention.

One embodiment of the method and apparatus of the present invention will now be discussed with reference to FIG. 1. FIG. 1 illustrates the components of one exemplary vending machine 100 including the features of the present invention. Although a specific exemplary vending machine 100 is referred to throughout the detailed description, the present invention is directed to any automatic sales machine that allows payment to be exchanged for goods. Payment can be presented through a variety of media including, but not limited to, coins, bills and other currencies, magnetic stripe cards and smart cards (whether pre-paid or linked to an account), and identification codes.

As shown, vending machine 100 includes an input device 110 for receiving input from a consumer, such as a product selection. Input device 110 may also be used for receiving input from an operator during stocking or maintenance of vending machine 100. Input device 110 preferably includes a set of alpha-numeric keys for providing input to vending machine 100. Alternatively, input device 110 could include a selector dial, a set of buttons associated with a respective set of item dispensers, or any other conventional input device which may be used to receive input from a consumer or operator. Further, vending machine 100 may include more than one input device 110. For example, vending machine 100 may include an exterior input device 110 for receiving consumer input and an interior input device (not shown) for receiving operator input. Input device 110 may provide the dual functionality of receiving input data from both operators and consumers.

Vending machine 100 also includes several mechanisms for receiving payment and dispensing change, including coin acceptor 112, bill validator 114, card reader 116 and change dispenser 118. Card reader 116 may be a conventional reader for reading data on the magnetic stripe of a credit or debit card, and it may cooperate with conventional point-of-sale credit card processing equipment (not shown) to validate card-based purchases through a conventional transaction authorization network. Alternatively, card reader 116 could be a chip-based "smart card" reader.

Coin acceptor 112, bill validator 114 and change dispenser 118 communicate with currency storage apparatus 120 and may include conventional devices such as Mars models AE-2400, MC5000, TRC200 or CoinCo model 9300-L. Coin acceptor 112 and bill validator 114 receive and validate currency that is stored by currency storage apparatus 120. Change dispenser 118 activates the return of coinage to the consumer.

With continuing reference to FIG. 1, components of vending machine 100, including input device 110, coin acceptor 112, bill validator 114, card reader 116, change dispenser 118, and currency storage apparatus 120, communicate with, and are controlled by, central processing unit (CPU) 126. CPU 126 may comprise a single processor or several processors operating in conjunction with each other. CPU 126 communicates with communication port 142 for communicating with a central server (not shown). CPU 126 communicates with random access memory (RAM) 128, read only memory (ROM) 130 and clock 132. CPU 126 also communicates with at least one item dispenser 122, at least one output device 124, and data storage device 134.

Output device 124 is preferably a liquid crystal display ("LCD") or a light emitting diode ("LED") display such as the display employed by vending machine model #631 manufactured by FastCorp and may provide a static message or a scrolling message so as to provide extensive information using a relatively small display area. Of course, output device 124 could be any conventional device for communicating information, including an audio or video sub-system.

With continuing reference to FIG. 1, data storage device 134 is shown which stores an inventory management table 200 and a program 160. Table 200 and program 160 comprise at least a portion of the data stored by data storage device 134 and are described more fully with reference to FIGS. 2-5B. Program 160 includes instructions for implementing the steps of the present invention. Data storage device 134 is preferably a magnetic disk drive, but could be a CD drive, optical disk drive, RAM drive or any other conventional storage device. Storage device 134 is preferably a secure device which enables only authorized operators to access the inventory management table 200 and program 160.

Although vending machine 100 has been shown with a plurality of components to carry-out the instant invention, one or more of these components can be disposed remotely from the vending machine 100. A plurality of vending machines may be disposed in communication with a central controller (not shown) which performs one or more of the functions of the structure depicted in FIG. 1 for each of the vending machines.

Inventory Management Table

FIG. 2 illustrates the contents of an exemplary inventory management table 200 stored within data storage device 134 of the present invention. Each record of the table 200 represents inventory data associated with a product dispensed by vending machine 100. In particular, table 200 contains fields for a product identifier 210, a category identifier 212, a dispenser identifier 214, an available inventory 216, a date stocked 218, an expiration date 220, a sales rate 224, a retail price 226 and a minimum acceptable price 230, each of which will now be described in greater detail below.

The contents of product identifier field 210 identifies a product to be dispensed by vending machine 100. Category identifier 212 stores broad classifications of the products dispensed by the vending machine 100. The contents of this field may be used to identify an optimal mystery product for sale to a consumer according to several embodiments of the present invention, as discussed further below. Dispenser identifier field 214 stores data identifying a corresponding item dispenser 122.

Inventory management table 200 also includes available inventory field 216 for storing a quantity of available items associated with product identifier 210. Available inventory field 216 is preferably updated by an operator upon stocking vending machine 100 to reflect the number of items stocked. Program 160 includes processing instructions for updating available inventory field 216 upon each sale of a product, to maintain an accurate indication of the quantity of every product. The date stocked field 218 is also updated by an operator upon stocking vending machine 100.

The expiration date field 220 contains the expiration date of products in the available inventory. If the available inventory contains products with different expiration dates, table 200 can be configured to contain a separate product identifier to uniquely identify each different product provided by vending machine 100. An operator preferably arranges products within a dispenser such that the first items to expire are arranged to be dispensed first. For example, with reference to FIG. 2, the first two items of table 200 are "BBQ Potato Chips" in dispenser S1. The first two items in dispenser S1 expire on Jan. 30, 1999 while the remaining items expire on Feb. 6, 1999.

With continuing reference to FIG. 2, a sales rate 224 is calculated by the program 160 and maintained in the table 200. Although the sales rate of FIG. 2 is shown in terms of items sold per day, the sales rate may be determined in other manners, such as items sold per hour, week or other appropriate period of time, depending on the category of item dispensed. For example, in view of the varying expiration periods for various products, it may be appropriate to determine a sales rate for milk in units of items/hour, while determining the sales rate for candy in units of items/week.

Retail price identifier 226 contains a pre-defined price, set by the vending machine operator, which is the standard retail price at which an item is to be sold from vending machine 100. The minimum acceptable price identifier 230 contains the minimum price for which an item may be sold. The minimum acceptable price may be the wholesale price, or may be greater or less than the wholesale price. In particular, some vendors may determine that it is best to receive any payment for an item prior to an item's expiration date, and therefore may be willing to accept a price below the wholesale price.

Numerous techniques for determining a current dynamic price for merchandise are well known, some of which are disclosed in the commonly owned, co-pending priority U.S. patent application Ser. No. 08/947,798 entitled "Method and Apparatus for Dynamically Managing Vending Machine Inventory Prices".

Mystery Product Vending Process Steps

Having thus described the system architecture and components of the present embodiment, the operation of the system will now be described in greater detail with reference to FIGS. 3-5B, and with continuing reference to FIGS. 1 and 2. It is to be understood that the software instructions necessary to provide the functionality described herein are preferably stored in storage device 134 of vending machine 100, but may be stored in ROM 130 or data storage device 134.

In general, the present invention enables a vending machine to automatically manage its inventory by offering consumers mystery products. The vending machine of the present invention is designed to determine an optimal product to sell at a given price, based on dynamically changing sales and revenue data. The identity of the mystery product is concealed from the consumer prior to purchase. As such, the consumer is unaware of specific product information, such as a product trademark, which uniquely distinguishes a particular product. As discussed in greater detail below, there are several embodiments of the present invention in which the identity of the mystery product is concealed from the consumer until (i) a monetary value is provided by the consumer, (ii) until the consumer agrees to accept the mystery product in exchange for previously provided monetary value, or (iii) until the product is dispensed.

In general, the embodiments of the present invention can be categorized in three groups: predetermined price embodiments, in which the vending machine sells one or more mystery products for a predetermined price; consumer-specified price embodiments, in which the consumer is allowed to specify a price for one or more mystery products, and upsell embodiments, in which the vending machine offers one or more upsell mystery products in exchange for the amount of change owed to a consumer, or in exchange for the change plus an input of an additional monetary value.

Predetermined Price Embodiments

Figure 3A:
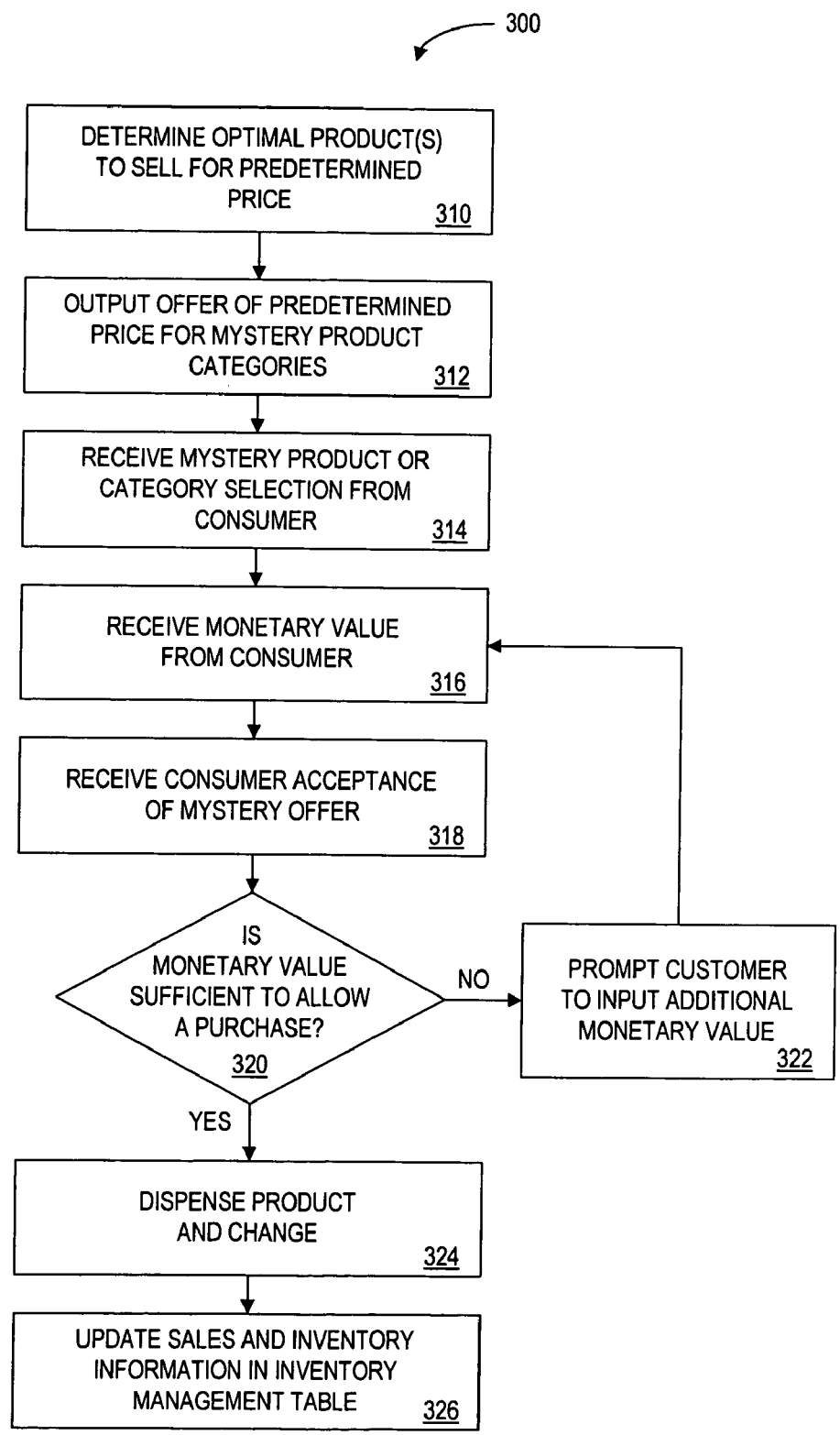
FIG. 3A is a flow chart illustrating the process steps for a series of embodiments in which the vending machine of FIG. 1 offers a mystery product for sale to a consumer for a pre-determined price.

With reference to FIG. 3A, the process 300 executed in the predetermined price embodiments of the present invention will now be described. In a predetermined price embodiment, vending machine 100 evaluates stored data and determines at least one appropriate product to offer at a fixed price. For example, vending machine 100 may periodically process a routine to evaluate sales rate, available inventory, expiration date, demand, supply, and/or other data which may be useful in determining a minimum acceptable price. This data is then used to determine at least one "mystery" product to sell at a minimum acceptable price.

The mystery product may be selected, for example, based on a low sales rate in order to increase sales, or on an upcoming expiration date in order to prevent a product from spoiling. Of course, the sales evaluation routine may be programmed to identify several optimal "mystery" products to be offered for the minimum acceptable price. An optimal product for sale may be a product within the vending machine having the earliest expiration date, the oldest stock date, the lowest sales rate, the largest inventory, the highest profit margin, the lowest profit margin, and/or some combination of these and/or other factors. An optimal product may also be a product pre-selected by the operator. Once vending machine 100 determines the mystery product or products, vending machine 100 may display an advertisement of a "mystery" product(s) to be sold at the predetermined minimum acceptable price.

Specifically, in an embodiment in which a mystery product is selected on the basis of an early expiration date, CPU 126 of vending machine 100 would execute instructions of program 160 to determine which product of inventory management table 200 has the earliest associated expiration date, as represented by the data stored in expiration date field 220. Record 252, representing "Beet's Fruit Juice," meets the criteria having an expiration date of "Jan. 6, 1999" which is earlier than the expiration date stored in all of the other records. Of course, this is only one example, and the specific programming for the selection of mystery products may be tailored to meet the needs of the vending machine operator.

According to a first predetermined price embodiment, the consumer is given the opportunity to input a specified amount of credit in order to be given a return of a mystery product. In this embodiment, the product is selected based on sales and inventory data, without regard to a product category. For example, vending machine 100 may output an advertisement such as, "mystery product available for $0.15."

Figure 6:
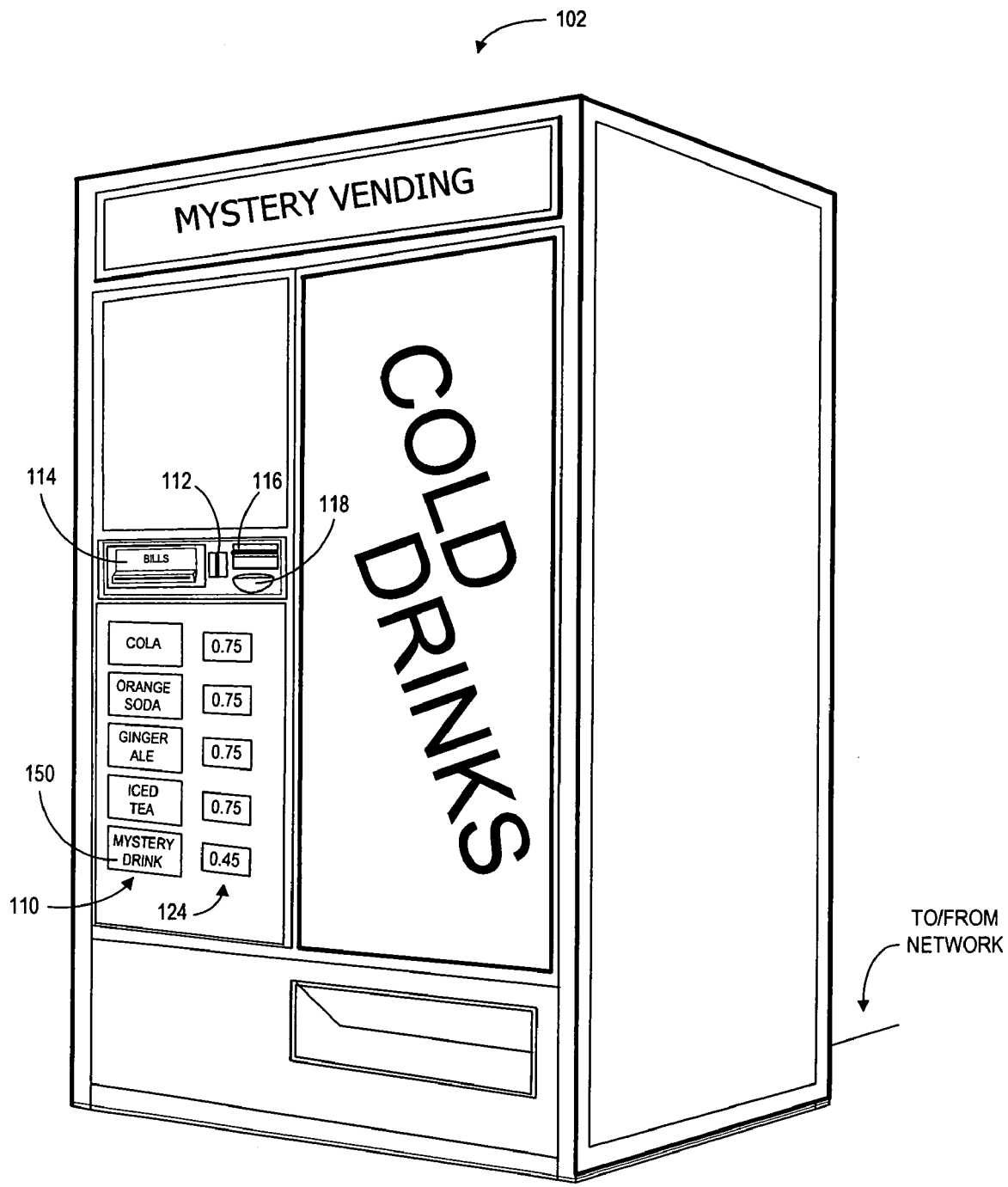
FIG. 6 is a perspective view of an exemplary vending machine constructed in accordance with the present invention.

Referring to FIG. 6, there is illustrated a vending machine 102 which provides a consumer an opportunity to purchase a mystery product at a predetermined price. As shown, input device 110 includes a plurality of buttons, each button representing a drink selection available to the consumer. Specifically, button 150 enables the consumer to select a "mystery drink." Vending machine 102 further includes a plurality of output devices 124. Each output device 124 displays a predetermined price associated with a drink selection button.

Each output device 124 is a liquid crystal display that may output a predetermined price. Each price may be determined by the operator or dynamically calculated by CPU 126. Specifically, output device 124 associated with button 150 displays "0.45" as illustrated. The price of $0.45 is calculated according to revenue management based on the available inventory for all of the available product selections.

According to a second predetermined price embodiment, the mystery product offered by vending machine 100 is selected based on a specific product category. For example, vending machine 100 may select a first mystery product categorized as a "snack" and a second mystery product categorized as a "drink." The advertisement output by vending machine 100 might read "$0.10 for a mystery snack and $0.25 for a mystery drink." The items in vending machine 100 can be categorized in any way that machine operator sees to be most practical or profitable.

According to a third predetermined price embodiment, vending machine 100 could offer a consumer a combination or package of products for a fixed price. The group of products could include a product selected from each category, depending on the types of products that the vending machine sells. In this embodiment, vending machine 100 would offer more than one product to the consumer as a "mystery" package. For example, vending machine 100 might advertise, "50 cents for a mystery meal including a snack and a beverage."

The process begins at step 310 at which vending machine 100 determines at least one optimal product to offer at a predetermined price. As discussed above, step 310 may include program steps to determine a single mystery product, multiple mystery products, at least one mystery product for each category or a mystery package comprising several products, each based on the factors discussed above. At step 312, an offer for a mystery product is communicated via the vending machine output device 124 to the consumer. The offer communicated by vending machine 100 will be consistent with the offers described above. Vending machine 100 may, for example, display "$0.20 for a mystery product" and/or "$1 for a mystery package of products". In one embodiment of the present invention, mystery product categories may also be displayed to the consumer. As such, the vending machine 100 may display options such as "$0.25 for a mystery soda", "$0.30 for a mystery snack", or "$1 for a mystery package, including a mystery snack and a mystery drink."

At step 314, vending machine 100 receives a category selection from the consumer, identifying the category of product the consumer wishes to purchase. Of course, not all predetermined price embodiments of the present invention require or permit the consumer to specify a product category.

In embodiments which do not require the consumer to specify a product category, the consumer may simply indicate a desire to purchase a mystery product via input device 110.

At step 316, the vending machine 100 receives a monetary value from the consumer. The monetary value is an amount available for use in making a purchase. Monetary value can be presented through a variety of media including, but not limited to, coins, bills and other currencies, magnetic stripe cards and smart cards (whether pre-paid or linked to an account), and identification codes.

At step 318, vending machine 100 receives input representing an acceptance of the offer displayed during step 312. In various embodiments of the present invention, the acceptance may be acknowledged by the consumer, for example, by pressing a "mystery" selection button (not shown), by indicating acceptance via input device 110 or by failing to decline the offer to dispense a mystery product within a predetermined time frame. At step 320, the sufficiency of the monetary value provided by the consumer is confirmed. If insufficient monetary value has been provided, a request for additional monetary value is presented via output device 124. In the event a credit or debit card is used by the consumer, step 320 may include a sub-step of authorizing the transaction.

At step 324, vending machine 100 dispenses the product, revealing the mystery product selection to the consumer. Vending machine 100 further dispenses any change due to the consumer at step 324. At step 326, the sales and inventory information of table 200 is updated to reflect the sale.

Figure 3B:
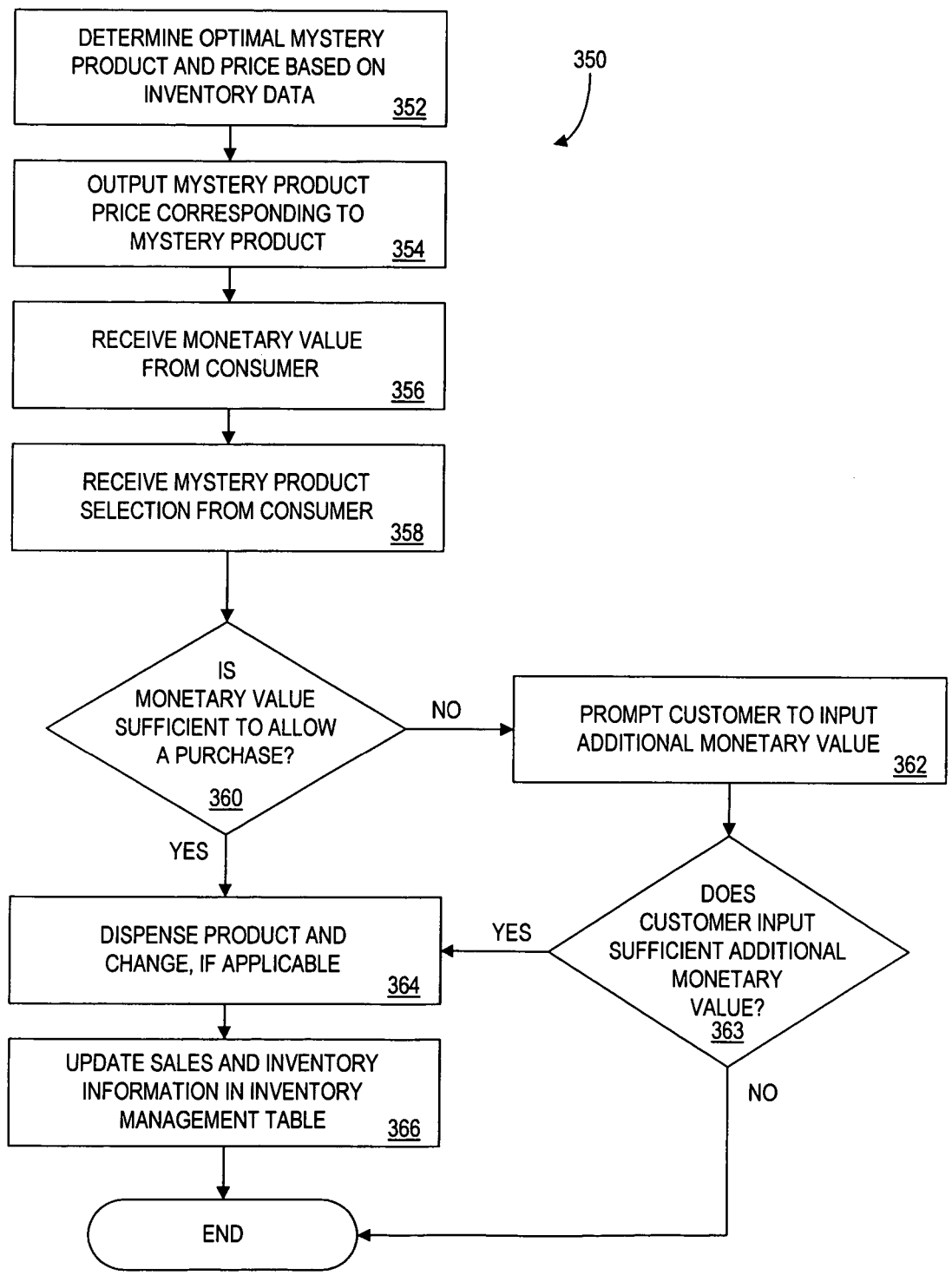
FIG. 3B is a flow chart illustrating the process steps for an embodiment in which the vending machine of FIG. 1 determines an optimal product to offer as a mystery product, determines a price at which to offer the product and completes a transaction in which the mystery product is sold to a consumer.

With reference to FIG. 3B, the process 350 executed in the predetermined price embodiments of the present invention will now be described. Process 350 begins at step 352 where vending machine 100 determines, through CPU 126 in conjunction with program 160, an optimal mystery product and an optimal price for the mystery product based on inventory data stored in table 200. This may be accomplished, for example, by including in program 160 a series of computer processing instructions to compare the values stored in available inventory field 216 for each product stored in vending machine 100. In one embodiment, these processing instructions may direct CPU 126 that a product with the highest inventory and the lowest sales rate is to be selected as the mystery product. The processing instructions may further direct CPU 126 that the minimum acceptable price stored in minimum acceptable price field 230 be determined based on the disparity between the selected mystery product and another product in the same category. As will be apparent to one of ordinary skill in the art, different factors and formulas may be applied to optimize both product selection and price calculation In one embodiment, CPU 126 may be programmed to calculate a price at which a selected mystery product is to be sold during process 350. This price, referred to hereinafter as the mystery product price, is preferably greater than the minimum acceptable price, which acts as a price floor in other embodiments of the invention disclosed herein. In determining this mystery product price, CPU 126 may be programmed, for example, to calculate the mystery product price as ninety percent of the product's retail price, rounded to the nearest nickel. Other formulae may be used, as will be apparent to one of ordinary skill in the art.

Returning to FIG. 3B, at step 354, the mystery product price, after being determined in the previous step, is displayed via output device(s) 324. At step 356, vending machine 100 receives a monetary value from a consumer via coin acceptor 112 or bill validator 114. At step 358, the consumer selects the mystery product via input device 110.

At step 360, CPU 126 determines the amount of money deposited by the consumer and compares it to the value stored in minimum acceptable price field 230 for the mystery product. If the monetary value is sufficient, process 350 continues at step 364, discussed below. If the monetary value is insufficient, at step 326 CPU 126 prompts the consumer through output device(s) 124 to input an additional monetary value. CPU 126 then determines if the consumer inputs an additional and sufficient monetary value by monitoring coin acceptor 112 and bill validator 114. If a sufficient monetary value is deposited, process 350 continues to step 364, otherwise process 350 ends.

At step 364, vending machine 100 dispenses the mystery product via item dispenser(s) 122. At step 366, CPU 126 updates the sales rate information stored in sales rate field 224 and the available inventory stored in available inventory field 126 corresponding to the product selected as a mystery product. After step 366, process 350 is halted until a next determination of a mystery product is made. This may be done at predetermined time intervals, or in some other manner, as will be apparent to one of ordinary skill in the art.

Consumer-Specified Price Embodiments

Figure 4:
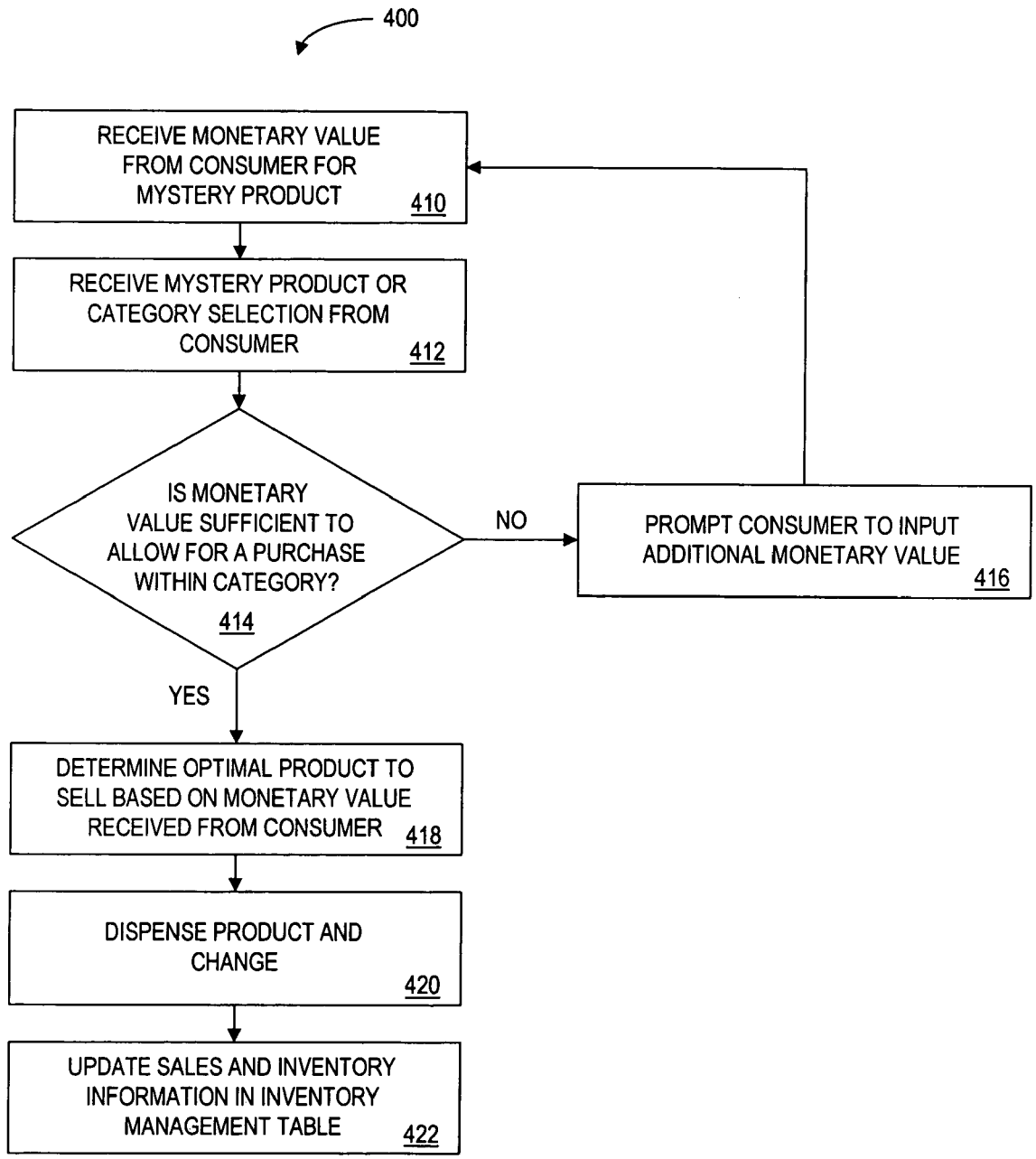
FIG. 4 is a flow chart illustrating the process steps for a series of embodiments in which the vending machine of FIG. 1 offers a mystery product for sale to a consumer at a consumer-specified price.

With reference to FIG. 4, the process 400 executed in the consumer-specified pricing embodiments of the present invention will now be described. These embodiments begin at step 410 with the receipt of monetary value from a consumer for a mystery product or package. In one embodiment of the present invention, the consumer may also be provided with an opportunity to request a mystery product category, such as a snack or beverage, or several categories for a package at step 412. Of course, this opportunity to select one or more product categories could be provided to the consumer prior to the vending machine 100 receiving any monetary value.

A determination is then made at step 414 as to whether the monetary value received from the consumer is sufficient to allow a purchase. This determination may be made in any of a number of ways. This determination may be made based on whether the received monetary value is greater than or equal to at least one minimum acceptable price stored in inventory management table 200. The determination may further be based on the available inventory field of inventory management table 200. In embodiments in which the consumer selects a product category, the determination may also be dependent on the product category of inventory management table 200. In embodiments in which the consumer selects a mystery package of products, the determination may also be based on the prices for each of several products.

If the consumer has not provided sufficient monetary value to complete a mystery purchase, the consumer is prompted to input additional monetary value at step 416. In one embodiment, if the consumer refuses to enter additional value in response to the prompt of step 416, the monetary value provided by the consumer is refunded.

If it is determined at step 414 that sufficient monetary value has been provided, vending machine 100 determines an optimal product or package at step 418. This determination may be made based on the criteria discussed with respect to step 310 of the predetermined price embodiments.

In another embodiment of the invention, the consumer may be provided with a choice of products at step 418, particularly if several products equally qualify as optimal products. In such an embodiment, the specific identity of the product choices may also be revealed to a consumer who has already provided the necessary monetary value and is now required to purchase one of the choices provided.

The product or package, as well as any change that may be due, is then dispensed to the consumer at step 420. In some cases, vending machine 100 may be one of multiple vending machines that communicate via a network. In such a case, multiple vending machines may operate in conjunction with each other to provide a package, such that a first vending machine may dispense a first product and a second vending machine may dispense a second product. At step 422, CPU 126 updates the sales and inventory information within the inventory management table 200.

Among the consumer-specified price embodiments, there are many embodiments which implement the aforementioned features of the present invention. Many other variations of these embodiments can also be implemented in view of the aforementioned alternatives for the predetermined price embodiments and the following alternatives discussed for the upsell embodiments of the present invention.

Upsell Embodiments

Figure 5A:
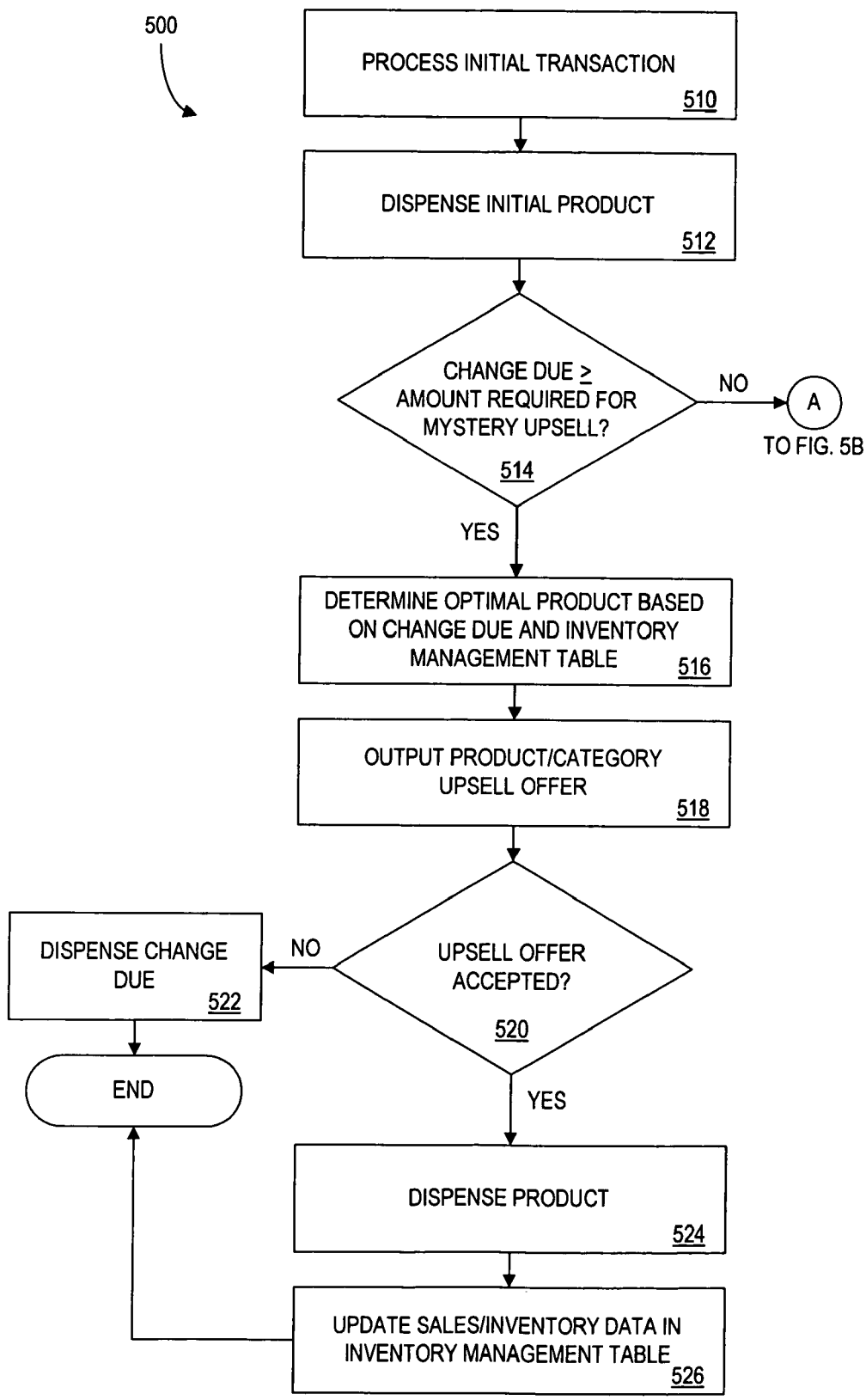
FIGS. 5A and 5B is a flow chart illustrating the process steps for a series of embodiments in which the vending machine of FIG. 1 offers a mystery product as an upsell product to a consumer.
Figure 5B:
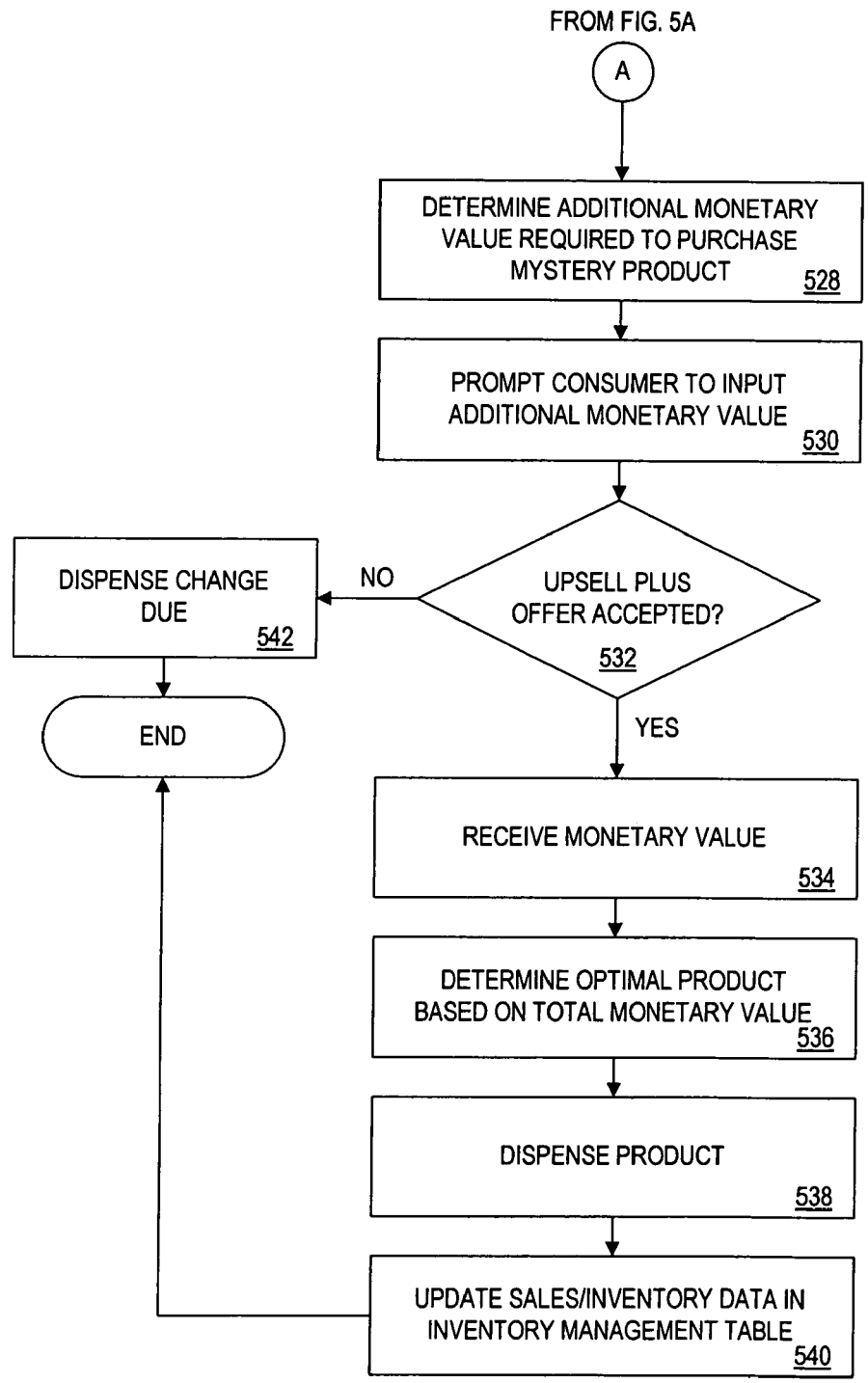

With reference to FIGS. 5A and 5B, process 500 for the upsell embodiments of the present invention will now be described. As previously defined, an upsell product is a product which is offered to a consumer which requires an additional input of monetary value, after the consumer has purchased a first product. In the preferred embodiment, the additional charge is equal to the amount of change owed a consumer (i.e. any excess monetary value remaining after the consumer has purchased a first product). The additional charge for the upsell, however, may be an amount greater than or less than the amount of change due.

With continuing reference to FIG. 5A, process 500 for the upsell embodiments begins with processing an initial transaction, illustrated by step 510, in which a consumer makes an initial product selection and provides monetary value for that selection. In one embodiment of the present invention, the selected product is dispensed at step 512. In other embodiments, dispensing of the selected product may be delayed until the process 500 is completed. A determination is then made at step 514 whether any change due to the consumer would support a purchase of a mystery upsell product. Although it is preferable that this determination includes comparing the amount of change due to the minimum acceptable prices in the inventory management table 200, it is to be understood that other prices, such as a predetermined price selected by the vending operator, may be used to make this determination, depending on the programming of the vending machine 100.

If the change due to the consumer is sufficient to support a mystery product upsell, the process determines the optimal product to be offered to the consumer at step 516. As previously discussed, there are a variety of factors which can be utilized to determine whether a product is optimal. In one embodiment, the determination of the optimal product is highly dependent on the product category of the product purchased by the consumer in step 510, so that the optimal product is selected from a complementary product category. For example, if the consumer selected a beverage, the optimal product could be selected from the snack category to complement the consumer's selection of a beverage.

At step 518, the optimal product is offered to the consumer as a mystery product for the amount of the change due to the consumer. If the change is sufficient, a package of mystery products may also be offered. Acceptance of the offer may be received in a number of ways, including detecting actuation of a "mystery" selection button 150, receiving acceptance via input device 110 or detecting a failure to decline the offer to dispense a mystery product within a predetermined time frame.

By detecting a failure to decline the offer within a predetermined time frame, the present invention enables the vending machine to provide a negative option. In accordance therewith, a timer, which can be displayed to the consumer, may be used in step 520 to advance the sale of upsell products. The timer may be controlled by CPU 126 and clock 132 and the time frame may be presented to the user via output device 124. This embodiment gives the consumer a specified time frame to decline the upsell offer. If the upsell offer is not declined within the specified time frame, the mystery product is automatically dispensed to the consumer for the amount of the change. The vending machine 100 can also be configured to influence the consumer to believe that they have won a prize when prompted with the offer. For example, output device 124 may be used to indicate "Congratulations. You qualify for a mystery product in exchange for your change."

If the offer is accepted at step 520, the upsell product is dispensed at step 524, and inventory management table 200 is updated at step 526. If the offer is not accepted at step 520, vending machine 100 dispenses the change due to the consumer at step 522. If the upsell offer is not accepted at step 520, the upsell offer may be repeated several times before proceeding to step 522, preferably with different product categories and prices displayed at each iteration. For example, if a generic upsell offer of "Would you like a mystery product in exchange for your $0.35 change?" is rejected, another offer may be provided in the form of "Would you like a mystery snack in exchange for your $0.35 change?" If this offer is rejected, another offer may be provided in the form of "Would you like a mystery beverage in exchange for your $0.35 change?" The price of the upsell offer may also be reduced, so that a mystery product is offered for only a portion of the consumer's change.

Referring now to FIG. 5B, a so-called "upsell plus embodiment" will now be described. If the amount of change due to the consumer is not great enough to support a second purchase, vending machine 100 may determine the amount of additional monetary value necessary to support a second purchase, such as a mystery purchase, at step 528. Vending machine 100, at step 530, prompts the consumer to input this determined amount of additional monetary value in exchange for a product. At step 532, if the consumer accepts the "upsell plus" offer, process 500 continues to step 534 in which vending machine 100 receives the determined additional monetary value from the consumer. Vending machine 100 may then determine, at step 536, an optimal upsell product based on the total monetary value (i.e. the change and the provided additional monetary value). The optimal product is dispensed to the consumer at step 538. At step 540, inventory management table 200 is updated, and process 500 is completed.

If the upsell plus offer is not accepted at step 532, the offer may be repeated a predetermined number of times with different mystery product categories and/or prices presented for the consumer's consideration at each iteration. If the upsell plus offer is not accepted at step 532, the consumer's change is returned at step 542.

Of course, the upsell embodiment of the present invention is not limited to the process of FIGS. 5A and 5B. For example, in another embodiment of the present invention, the vending machine 100 may be configured to determine an optimal product to offer to the consumer for the amount of the change plus some additional monetary value, without first determining whether the change alone will be sufficient to offer the consumer some mystery product. If a perishable item is about to expire, for example, the vending machine 100 may be configured to focus on selling this item, to the exclusion of other items. As such, the vending machine 100 may offer this product to consumer for the change plus $0.10, even though another item (which is not about to expire) could have been offered for the amount of the change alone.

In yet another embodiment, the vending machine 100 may be configured to offer alternative mystery products to a consumer, in place of a product selected by a consumer. For example, if a consumer has inserted $0.65 (or more) for a selected brand of a $0.65 snack, the vending machine 100 may offer two mystery snacks to the consumer in place of the selected brand. As with many of the aforementioned embodiments, this may be particularly effective in rapidly advancing the sale of expiring or slow-selling items.

It is to be understood that the method and apparatus of the present invention has many applications, and that the present invention is not limited to the representative examples disclosed herein. Moreover, the scope of the present invention covers conventionally known variations and modifications to the system components described herein. Accordingly, the embodiments described above are provided for illustrative purposes only and do not limit the scope of the present invention, as defined by the appended claims.

What is claimed is:

1. A method, comprising:
    offering for sale, by a vending machine, a plurality of products, wherein each product of the plurality of products is associated with a retail price, and wherein the retail prices are displayed to consumers;
    selecting, by a processing device of the vending machine, one of the plurality of products to be offered as a mystery product, wherein the selection is based at least in part on data associated with the selected product;
    calculating, by the processing device, a mystery product price for the selected mystery product, wherein the mystery product price is greater than a pre-determined minimum acceptable price for the mystery product and less than the retail price associated with the mystery product;
    displaying an offer for the mystery product to consumers, the offer comprising an indication of the mystery product price, and wherein the offer does not comprise an indication of the identity of the mystery product;
    determining, by the processing device, an acceptance of the offer by a consumer;
    receiving, by the vending machine, an indication of funds provided by the consumer;
    determining, by the processing device, that the funds are greater than or equal to the mystery product price; and
    dispensing the mystery product to the consumer.

2. The method of claim 1, wherein the offer comprises an indication of a category associated with the mystery product.

3. The method of claim 1, wherein the data associated with the mystery product comprises an expiration date of the mystery product.

4. The method of claim 1, wherein the data associated with the mystery product comprises a stock date of the mystery product.

5. The method of claim 1, wherein the data associated with the mystery product comprises a sales rate of the mystery product.

6. The method of claim 1, wherein the data associated with the mystery product comprises an inventory of the mystery product.

7. The method of claim 1, wherein the data associated with the mystery product comprises a profit margin of the mystery product.

8. The method of claim 1, wherein the data associated with the mystery product comprises at least two of:
    an expiration date of the mystery product;
    a stock date of the mystery product;
    a sales rate of the mystery product;
    an inventory of the mystery product; and
    a profit margin of the mystery product.

9. A method, comprising:
    displaying, via a display device of a vending machine, an offer for a mystery product, wherein the offer only identifies a category associated with the mystery product and a mystery product price associated with the mystery product;
    receiving, from a consumer, an indication of an acceptance of the displayed offer;
    receiving, by the vending machine, an indication of funds provided by the consumer;
    determining, by a processing device of the vending machine, that the funds are greater than or equal to the displayed mystery product price; and
    dispensing the mystery product to the consumer.

10. The method of claim 9, wherein the category comprises a "snack" category.

11. The method of claim 9, wherein the category comprises a "drink" category.

12. The method of claim 9, further comprising:
    selecting, by the processing device, the mystery product from a plurality of available products offered for sale by the vending machine, wherein the mystery product is selected from a subset of the available products that are associated with the displayed category.

13. A method, comprising:
    displaying, via a display device of a vending machine, an offer for a mystery package comprising a first mystery product and a second mystery product, wherein the offer only identifies (i) a first category associated with the first mystery product, (ii) a second category associated with the second mystery product, and (iii) a mystery package price associated with the mystery package;
    receiving, from a consumer, an indication of an acceptance of the displayed offer;
    receiving, by the vending machine, an indication of funds provided by the consumer;
    determining, by a processing device of the vending machine, that the funds are greater than or equal to the displayed mystery package price; and
    dispensing each of the first and second mystery products to the consumer.

14. The method of claim 13, further comprising:
    selecting, by the processing device, the first mystery product from a first subset of a plurality of available products offered for sale by the vending machine, the first subset being associated with the first category; and
    selecting, by the processing device, the second mystery product from a second subset of a plurality of available products offered for sale by the vending machine, the second subset being associated with the second category.

15. The method of claim 13, wherein the first and second categories are different.

16. The method of claim 15, wherein the first category comprises a "snack" category and wherein the second category comprises a "drink" category.

17. A method, comprising:

receiving, by a vending machine, an indication of a product category that defines a subset of products offered for sale by the vending machine, the product category being selected by a consumer;

receiving, by the vending machine, an indication of a monetary amount provided by the consumer;

selecting, by a processing device of the vending machine, and based on the product category selected by the consumer and the monetary amount provided by the consumer, a mystery product associated with the product category, wherein a minimum price associated with the mystery product is less than or equal to the monetary amount provided by the consumer; and dispensing the mystery product to the consumer, the dispensing revealing the identity of the mystery product to the consumer.

18. A method, comprising:

receiving, by a vending machine, an indication of a selection of a product by a consumer receiving, by the vending machine, an indication of funds provided by the consumer;

determining, by a processing device of the vending machine, that an amount of change is due to the consumer;

identifying a product offered for sale by the vending machine that is associated with a minimum acceptable price that is less than or equal to the amount of change due to the consumer;

offering the identified product to the consumer as a mystery product in exchange for the amount of change due to the consumer;

determining an acceptance of the offer;

dispensing the selected product to the consumer; and dispensing the mystery product to the consumer, the dispensing of the mystery product revealing the identity of the mystery product to the consumer.

* * * * *